US012217660B2

(12) United States Patent
Kim et al.

(10) Patent No.: US 12,217,660 B2
(45) **Date of Patent: *Feb. 4, 2025**

(54) DISPLAY DEVICE AND DRIVING METHOD THEREOF

(71) Applicant: Samsung Display Co., Ltd., Yongin-si (KR)

(72) Inventors: Soon-Dong Kim, Osan-si (KR); Sangan Kwon, Cheonan-si (KR); Taehoon Kim, Hwaseong-si (KR); Jin-Wook Yang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,909

(22) Filed: Sep. 15, 2023

(65) Prior Publication Data

US 2024/0005851 A1 Jan. 4, 2024

Related U.S. Application Data

(63) Continuation of application No. 17/890,761, filed on Aug. 18, 2022, now Pat. No. 11,798,463.

(30) Foreign Application Priority Data

Dec. 3, 2021 (KR) ........................ 10-2021-0172417

(51) Int. Cl.
*G09G 3/3266* (2016.01)
*G09G 3/32* (2016.01)

(52) U.S. Cl.
CPC ....... *G09G 3/32* (2013.01); *G09G 2310/0267* (2013.01); *G09G 2330/021* (2013.01)

(58) Field of Classification Search
CPC ............. G09G 3/32; G09G 2310/0267; G09G 2330/021; G09G 3/3266; G06F 3/1431
See application file for complete search history.

(56) References Cited

U.S. PATENT DOCUMENTS 9,542,889 B2 1/2017 Lee et al.
11,049,451 B2 6/2021 Park et al.
(Continued)

FOREIGN PATENT DOCUMENTS

KR 1020190083393 A 7/2019
KR 102135432 B1 7/2020
KR 1020210013477 A 2/2021

*Primary Examiner* — Abdul-Samad A Adediran
(74) *Attorney, Agent, or Firm* — CANTOR COLBURN LLP

(57) ABSTRACT

A display device includes: a display panel including a plurality of pixels connected to a plurality of scan lines; a scan driving circuit, which drives the plurality of scan lines in synchronization with a clock signal; and a driving controller, which outputs the clock signal. While an operating mode is a multi-frequency mode, the driving controller comparts the display panel into a first display area and a second display area. A hold frame of the multi-frequency mode includes a first section during which the first display area is driven, and a second section during which the second display area is driven. The driving controller outputs the clock signal of a normal power mode during the first section and outputs the clock signal of a low-power mode during the second section.

20 Claims, 20 Drawing Sheets

(56) References Cited

U.S. PATENT DOCUMENTS

| | | | | |
|---|---|---|---|---|
| 2019/0206329 | A1 | 7/2019 | Lee et al. | |
| 2021/0174716 | A1* | 6/2021 | Noh | G06F 3/1431 |
| 2022/0157250 | A1* | 5/2022 | Kim | G09G 3/3266 |

* cited by examiner

DISPLAY DEVICE AND DRIVING METHOD THEREOF

This application is a continuation of U.S. patent application Ser. No. 17/890,761, filed on Aug. 18, 2022, which claims priority to Korean Patent Application No. 10-2021-0172417, filed on Dec. 3, 2021, and all the benefits accruing therefrom under 35 U.S.C. § 119, the content of which in its entirety is herein incorporated by reference.

BACKGROUND

Embodiments of the present disclosure described herein relate to a display device.

A display device includes pixels connected to data lines and scan lines. In general, each of the pixels includes a light emitting element and a pixel circuit for controlling a current flowing to the light emitting element. In response to a data signal, the circuit unit may control a current that flows from a first driving voltage to a second driving voltage via the light emitting element. At this time, light having a predetermined luminance may be generated in response to a current flowing via the light emitting element.

There is a lot of work going on to reduce power consumption of the display device.

SUMMARY

Embodiments of the present disclosure provide a display device capable of reducing power consumption, and a driving method thereof.

According to an embodiment, a display device includes: a display panel including a plurality of pixels connected to a plurality of scan lines; a scan driving circuit, which drives the plurality of scan lines in synchronization with a clock signal; and a driving controller, which outputs the clock signal. While an operating mode is a multi-frequency mode, the driving controller comparts the display panel into a first display area and a second display area. In the multi-frequency mode, the scan driving circuit provides scan signals of a first operating frequency to first scan lines positioned in the first display area among the plurality of scan lines, and provides scan signals of a second operating frequency lower than the first operating frequency to second scan lines positioned in the second display area among the plurality of scan lines. A hold frame of the multi-frequency mode includes a first section during which the first display area is driven, and a second section during which the second display area is driven. The driving controller outputs the clock signal of a normal power mode during the first section and outputs the clock signal of a low-power mode during the second section.

In an embodiment, during the first section, a frequency of the clock signal may be a first clock frequency. During the second section, the frequency of the clock signal may be a second clock frequency lower than the first clock frequency.

In an embodiment, during the first section, the clock signal may have a first pulse width. During the second section, the clock signal may have a second pulse width greater than the first pulse width.

In an embodiment, the driving controller may receive a mode signal and may output the clock signal having one of the first clock frequency and the second clock frequency in response to the mode signal.

In an embodiment, the display device may further include a voltage generator, which generates a first voltage and a second voltage in response to a voltage control signal. The driving controller may output the voltage control signal corresponding to the operating mode and may output the clock signal that swings between the first voltage and the second voltage.

In an embodiment, while the operating mode is a single-frequency mode, the first voltage may have a first voltage level, and the second voltage may have a second voltage level lower than the first voltage level.

In an embodiment, while the operating mode is the multi-frequency mode, during the second section, the first voltage may have a third voltage level lower than the first voltage level, and the second voltage may have a fourth voltage level higher than the second voltage level.

In an embodiment, during the first section of the hold frame, the clock signal may have a first amplitude. During the second section of the hold frame, the clock signal may have a second amplitude smaller than the first amplitude.

In an embodiment, while the operating mode is the multi-frequency mode, the driving controller may output a scan-enable signal indicating a start timing of the second section. The scan driving circuit may maintain scan signals, which are provided to the second scan lines positioned in the second display area, from among the plurality of scan lines at inactive levels in response to the scan-enable signal.

In an embodiment, during the first section of the hold frame, the clock signal may have a first pulse width and a first amplitude. During the second section of the hold frame, the clock signal may have a second pulse width greater than the first pulse width and a second amplitude smaller than the first amplitude.

In an embodiment, while the operating mode is a single-frequency mode, the scan driving circuit may provide the plurality of scan lines with scan signals of a normal frequency lower than or equal to the first operating frequency and higher than the second operating frequency.

According to an embodiment, a display device includes: a display panel including a plurality of pixels connected to a plurality of scan lines; a scan driving circuit, which drives the plurality of scan lines in synchronization with a clock signal; a voltage generator, which generates a first voltage and a second voltage in response to a voltage control signal; and a driving controller, which outputs the clock signal and the voltage control signal. While an operating mode is a multi-frequency mode, the driving controller comparts the display panel into a first display area and a second display area. In the multi-frequency mode, the scan driving circuit provides scan signals of a first operating frequency to first scan lines positioned in the first display area among the plurality of scan lines, and provides scan signals of a second operating frequency lower than the first operating frequency to second scan lines positioned in the second display area among the plurality of scan lines. A hold frame of the multi-frequency mode includes a first section during which the first display area is driven, and a second section during which the second display area is driven. A voltage difference between the first voltage and the second voltage during the second section is smaller than a voltage difference between the first voltage and the second voltage during the first section. The clock signal is a signal that swings between the first voltage and the second voltage.

In an embodiment, during the first section, the first voltage may have a first voltage level, and the second voltage may have a second voltage level different from the first voltage level.

In an embodiment, during the second section, the first voltage may have a third voltage level lower than the first voltage level, and the second voltage may have a fourth voltage level higher than the second voltage level.

In an embodiment, during the first section, the clock signal may have a first clock frequency. During the second section, the clock signal may have a second clock frequency lower than the first clock frequency.

In an embodiment, during the first section, the clock signal may have a first pulse width. During the second section, the clock signal may have a second pulse width greater than the first pulse width.

In an embodiment, while the operating mode is a single-frequency mode, the first voltage may have a first voltage level, and the second voltage may have a second voltage level different from the first voltage level.

In an embodiment, the driving controller may receive a mode signal and may output the voltage control signal and the clock signal in response to the mode signal.

In an embodiment, while the operating mode is the multi-frequency mode, the driving controller may output a scan-enable signal indicating a start timing of the second section. The scan driving circuit may maintain scan signals, which are provided to the scan lines positioned in the second display area, from among the plurality of scan lines at inactive levels in response to the scan-enable signal.

According to an embodiment, a driving method of a display device include: in a multi-frequency mode, computing a display panel into a first display area and a second display area, driving the first display area at a first operating frequency, and driving the second display area at a second operating frequency different from the first operating frequency; determining whether a current frame is a hold frame of the multi-frequency mode, outputting a clock signal of a normal power mode during a first section of the hold frame; outputting the clock signal of a low-power mode during a second section of the hold frame; and driving scan lines of the display panel in synchronization with the clock signal.

In an embodiment, during the first section, a frequency of the clock signal may be a first clock frequency. During the second section, the frequency of the clock signal may be a second clock frequency lower than the first clock frequency.

In an embodiment, during the first section, the clock signal may have a first amplitude. During the second section, the clock signal may have a second amplitude smaller than the first amplitude.

In an embodiment, during the first section, the clock signal may have a first pulse width and a first amplitude. During the second section, the clock signal may have a second pulse width greater than the first pulse width and a second amplitude smaller than the first amplitude.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
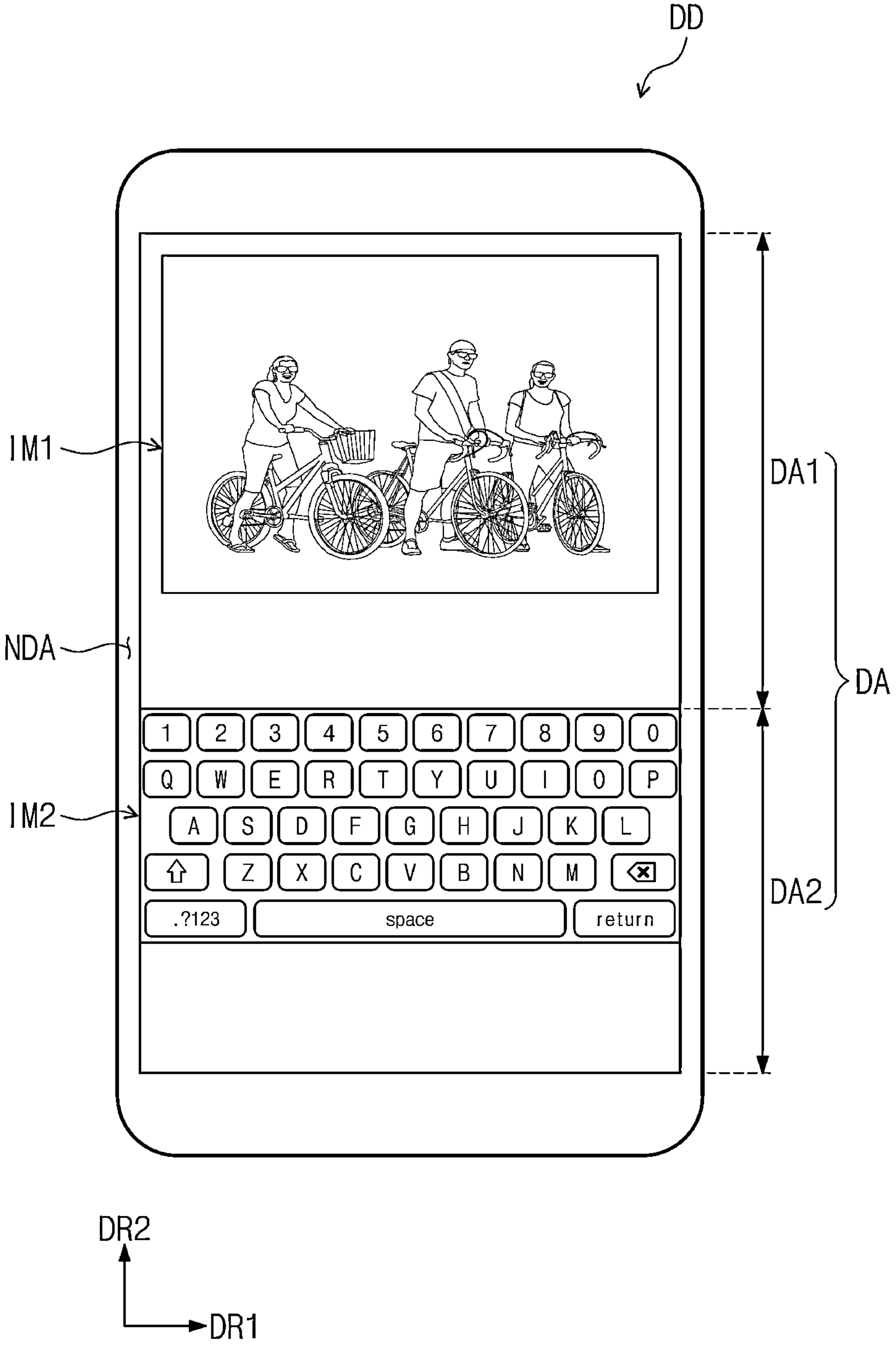
FIG. 1 illustrates a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent. For example, "an element" has the same meaning as "at least one element," unless the context clearly indicates otherwise. "At least one" is not to be construed as limiting "a" or "an." "Or" means "and/or."

Also, the terms “under”, “beneath”, “on”, “above”, etc. are used to describe a relationship between components illustrated in a drawing. The terms are relative and are described with reference to a direction indicated in the drawing.

It will be understood that the terms “include”, “comprise”, “have”, etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 illustrates a display device, according to an embodiment of the present disclosure.

Referring to FIG. 1, a portable terminal is illustrated as an example of a display device DD according to an embodiment of the present disclosure. The portable terminal may include a tablet PC, a smartphone, a personal digital assistant (“PDA”), a portable multimedia player (“PMP”), a game console, a wristwatch-type electronic device, and the like. However, the present disclosure is not limited thereto. In another embodiment, the present disclosure may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it is obvious that the display device DD may be applied to any other electronic device(s) without departing from the concept of the present disclosure.

As shown in FIG. 1, a display surface, on which a first image IM1 and a second image IM2 are displayed, is parallel to a plane defined by a first direction DR1 and a second direction DR2. The display device DD includes a plurality of areas comparted on the display surface. The display surface includes a display area DA, in which the first image IM1 and the second image IM2 are displayed, and a non-display area NDA adjacent to the display area DA. The non-display area NDA may be referred to as a bezel area. In an embodiment, for example, the display area DA may have a rectangular shape. The non-display area NDA surrounds the display area DA. Also, although not illustrated, for example, the display device DD may include a partially-curved shape. As a result, one area of the display area DA may have a curved shape.

The display area DA of the display device DD includes a first display area DA1 and a second display area DA2. In a specific application program, the first image IM1 may be displayed on the first display area DA1, and the second image IM2 may be displayed on the second display area DA2. In an embodiment, for example, the first image IM1 may be an image having a fast change cycle (e.g., video). The second image IM2 may be an image (e.g., a still image such as a photo or text information) having a long change period.

The operating mode of the display device DD may include a single-frequency mode and a multi-frequency mode. In the single-frequency mode, the display device DD may drive both the first display area DA1 and the second display area DA2 at the same, normal frequency. In the multi-frequency mode, the display device DD according to an embodiment may drive the first display area DA1 where the first image IM1 is displayed at a first operating frequency, and may drive the second display area DA2 where the second image IM2 is displayed, at a second operating frequency. In an embodiment, the first operating frequency may be higher than or equal to the normal frequency. The second operating frequency may be lower than the normal frequency. The display device DD may reduce power consumption by lowering the operating frequency of the second display area DA2.

The size of each of the first display area DA1 and the second display area DA2 may be a preset size, and may be changed by an application program.

In an embodiment, when the still image is displayed in the first display area DA1 and the video is displayed in the second display area DA2, the first display area DA1 may be driven at a frequency lower than the normal frequency, and the second display area DA2 may be driven at the normal frequency or a frequency higher than or equal to the normal frequency.

In an embodiment, the display area DA may be divided into three or more display areas. An operating frequency of each of the display areas may be determined depending on the type (a still image or video) of an image displayed in each of the display areas.

Figure 2A:
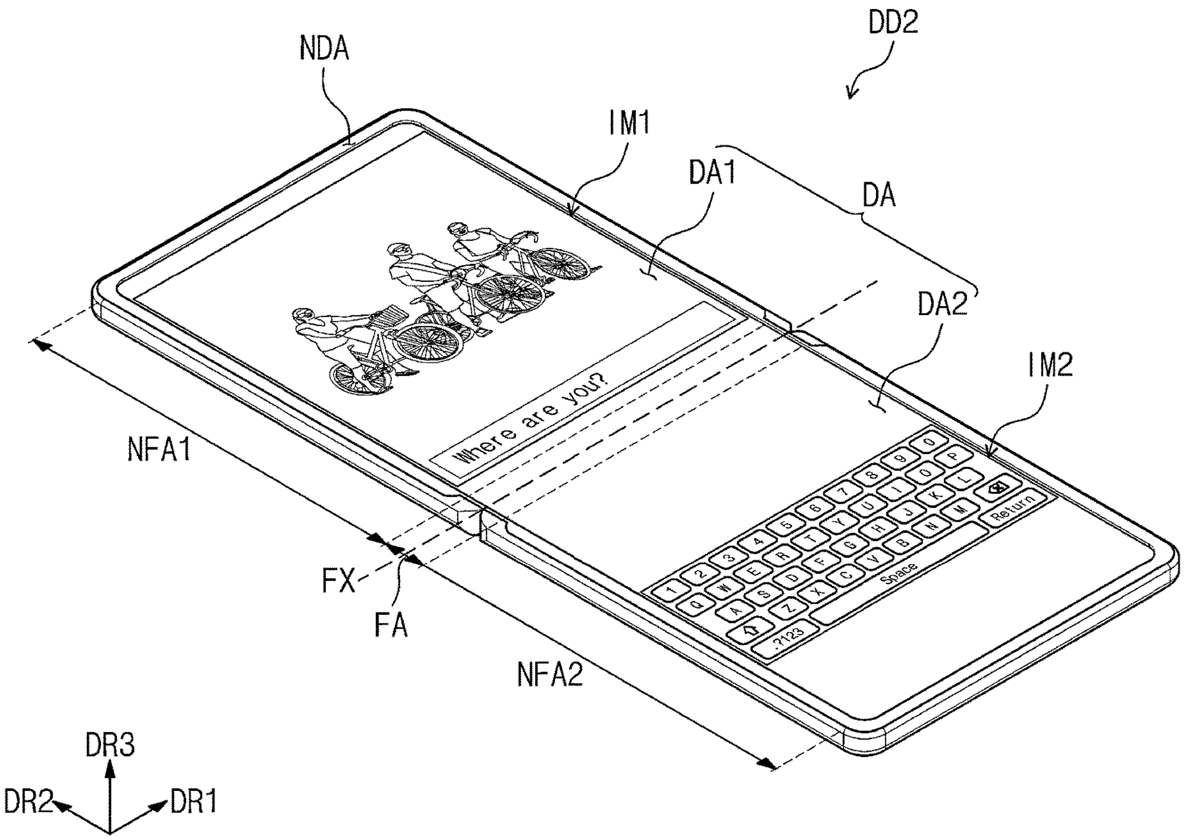
FIGS. 2A and 2B are perspective views of a display device, according to an embodiment of the present disclosure.
Figure 2B:
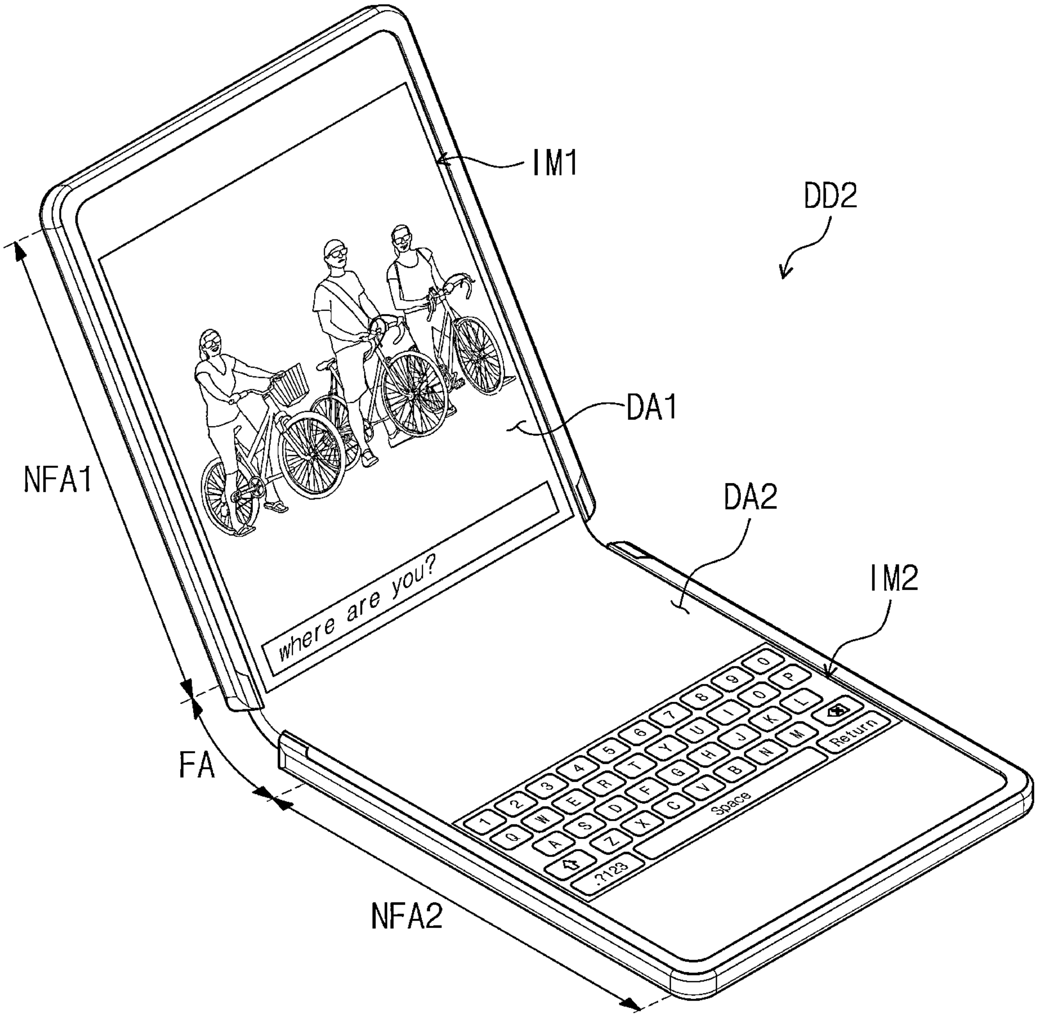

FIGS. 2A and 2B are perspective views of a display device DD2, according to an embodiment of the present disclosure. FIG. 2A illustrates the display device DD2 in an unfolded state. FIG. 2B illustrates the display device DD2 in a folded state.

As shown in FIGS. 2A and 2B, the display device DD2 includes the display area DA and the non-display area NDA. The display device DD2 may display an image through the display area DA. The display area DA may include a plane defined by the first direction DR1 and the second direction DR2, in a state where the display device DD2 is unfolded. The thickness direction of the display device DD2 may be parallel to a third direction DR3 crossing the first direction DR1 and the second direction DR2. Accordingly, the front surfaces (or upper surfaces) and the bottom surfaces (or lower surfaces) of the members constituting the display device DD2 may be defined based on the third direction DR3. The non-display area NDA may be referred to as a bezel area. In an embodiment, for example, the display area DA may have a rectangular shape. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as “in-folding”. However, embodiments are not limited thereto and the operation of the display device DD2 is not limited thereto.

In an embodiment of the present disclosure, when the display device DD2 is folded, the first non-folding area NFA1 and the second non-folding area NFA2 may be opposite to each other. Accordingly, in a state where the display device DD2 is folded, the first non-folding area NFA1 may be exposed to the outside, which may be referred to as "out-folding".

The display device DD2 may perform only one operation of an in-folding operation or an out-folding operation. Alternatively, the display device DD2 may perform both the in-folding operation and the out-folding operation. In this case, the same area of the display device DD2, for example, the folding area FA may be folded inwardly and outwardly. Alternatively, some areas of the display device DD2 may be folded inwardly, and other areas may be folded outwardly.

One folding area and two non-folding areas are illustrated in FIGS. 2A and 2B, but the number of folding areas and the number of non-folding areas are not limited thereto. In another embodiment, for example, the display device DD2 may include a plurality of non-folding areas, of which the number is greater than two, and a plurality of folding areas interposed between non-folding areas adjacent to one another.

FIGS. 2A and 2B illustrates that the folding axis FX is parallel to the minor axis of the display device DD2. However, the present disclosure is not limited thereto. In another embodiment, for example, the folding axis FX may extend in a direction parallel to the major axis of the display device DD2, for example, the second direction DR2.

FIGS. 2A and 2B illustrate that the first non-folding area NFA1, the folding area FA, and the second non-folding area NFA2 may be sequentially arranged in the second direction DR2. However, the present disclosure is not limited thereto. In another embodiment, for example, the first non-folding area NFA1, the folding area FA, and the second non-folding area NFA2 may be sequentially arranged in the first direction DR1.

The plurality of display areas DA1 and DA2 may be defined in the display area DA of the display device DD2. FIG. 2A illustrates the two display areas DA1 and DA2 as an example. However, the number of display areas DA1 and DA2 is not limited thereto.

The plurality of display areas DA1 and DA2 may include the first display area DA1 and the second display area DA2. In an embodiment, for example, the first display area DA1 may be an area where the first image IM1 is displayed, and the second display area DA2 may be an area in which the second image IM2 is displayed. In an embodiment, for example, the first image IM1 may be a video, and the second image IM2 may be a still image.

The display device DD2 according to an embodiment may operate differently depending on an operating mode. The operating mode of the display device DD2 may include a single-frequency mode and a multi-frequency mode. In the single-frequency mode, the display device DD2 may drive both the first display area DA1 and the second display area DA2 at a normal frequency. In the multi-frequency mode, the display device DD2 according to an embodiment may drive the first display area DA1 where the first image IM1 is displayed at a first operating frequency, and may drive the second display area DA2 where the second image IM2 is displayed, at a second operating frequency. In an embodiment, the first operating frequency may be higher than or equal to the normal frequency. The second operating frequency may be lower than the normal frequency.

The size of each of the first display area DA1 and the second display area DA2 may be a preset size, and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entire folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, the size of the second display area DA2 may be greater than the size of the first display area DA1.

In an embodiment, the first display area DA1 may correspond to the first non-folding area NFA1, the folding area FA, and the first portion of the second non-folding area NFA2, and the second display area DA2 may be the second portion of the second non-folding area NFA2. That is, the size of the first display area DA1 may be greater than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

FIGS. 2A and 2B illustrates that the display device DD2 has one folding area, as an example of a display device. However, the present disclosure is not limited thereto. In another embodiment, for example, the present disclosure may also be applied to a display device having two or more folding areas, a rollable display device, or a slideable display device.

Hereinafter, the display device DD shown in FIG. 1 will be described as an example. However, the present disclosure may be identically applied to the display device DD2 shown in FIGS. 2A and 2B.

Figure 3A:
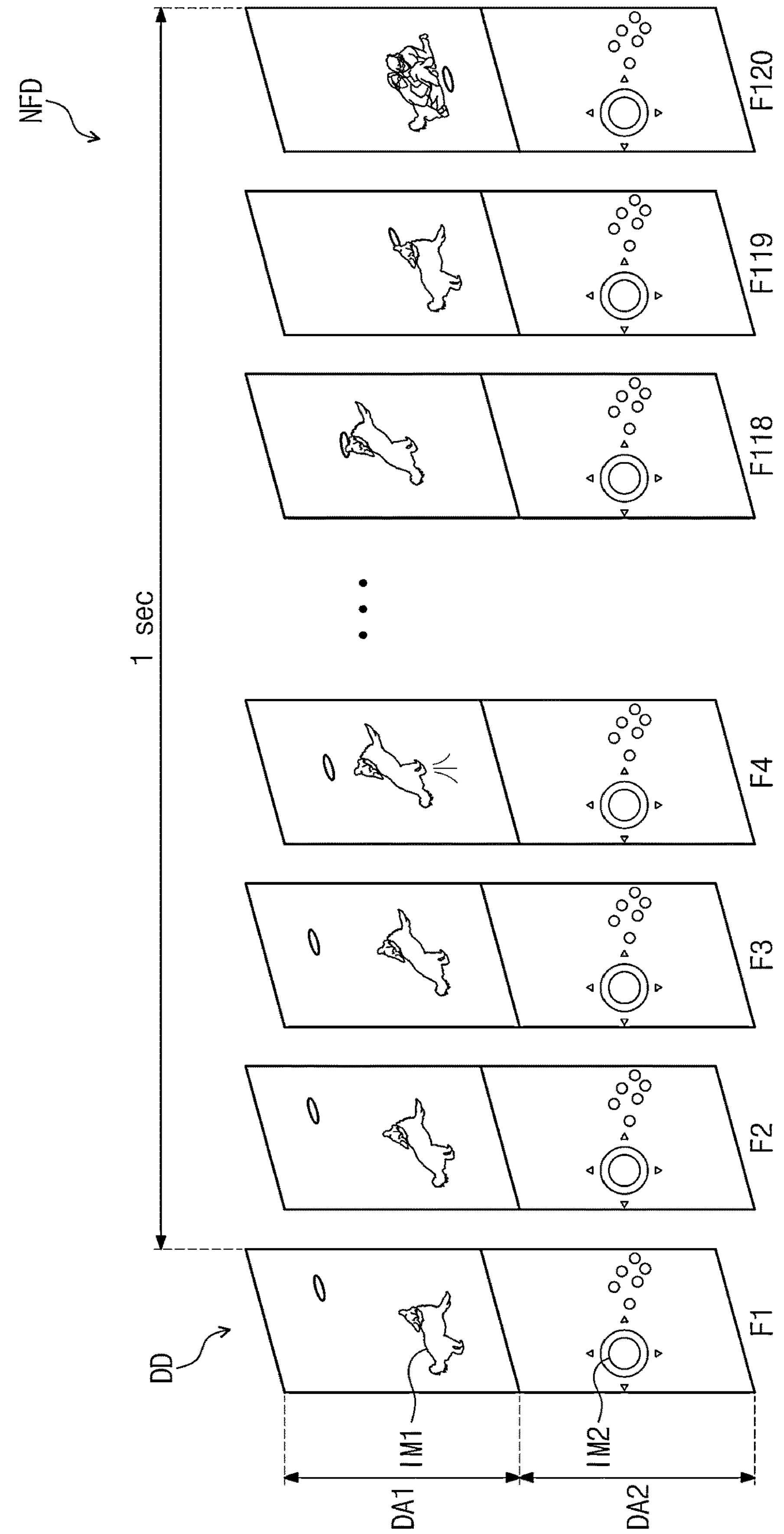
FIG. 3A is a diagram for describing an operation of a display device in a single-frequency mode.
Figure 3B:
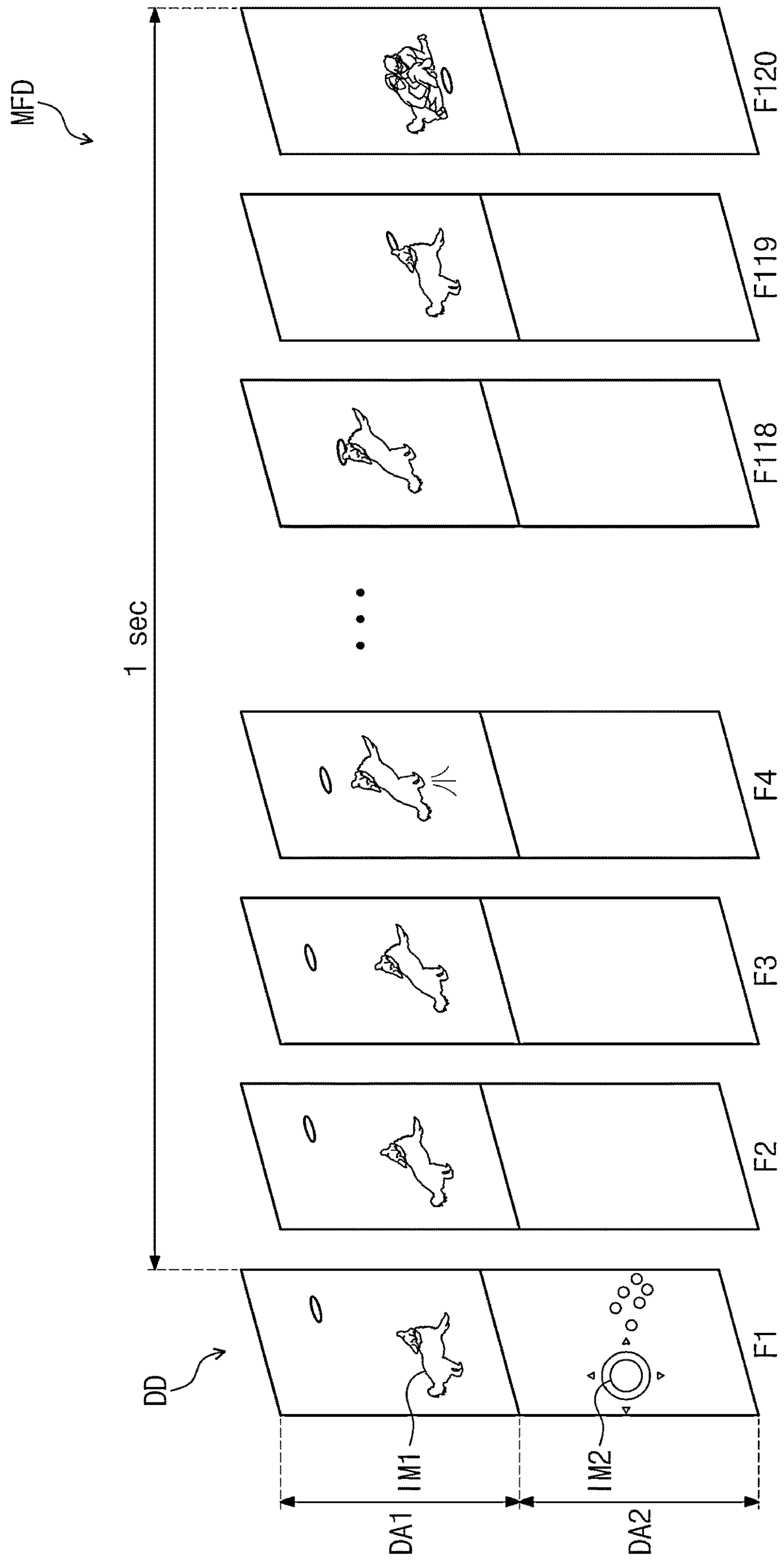
FIG. 3B is a diagram for describing an operation of a display device in a multi-frequency mode.

FIG. 3A is a diagram for describing an operation of a display device in a single-frequency mode. FIG. 3B is a diagram for describing an operation of a display device in a multi-frequency mode.

Referring to FIG. 3A, the first image IM1 displayed in the first display area DA1 may be a video. The second image IM2 displayed in the second display area DA2 may be a still image or an image (e.g., a keypad for manipulating a game) having a long change period. The first image IM1 displayed in the first display area DA1 shown in FIG. 3A and the second image IM2 displayed in the second display area DA2 are examples, and various images may be displayed on the display device DD.

In a single-frequency mode NFD, the operating frequencies of the first display area DA1 and the second display area DA2 of the display device DD are normal frequencies. In an embodiment, for example, the normal frequency may be 120 hertz (Hz). In the single-frequency mode NFD, images of the first to 120th frames F1 to F120 may be sequentially displayed in the first display area DA1 and the second display area DA2 of the display device DD for 1 second.

Referring to FIG. 3B, in the multi-frequency mode MFD, the display device DD may set an operating frequency of the first display area DA1, in which the first image IM1 (i.e., a video) is displayed, as a first operating frequency, and may set an operating frequency of the second display area DA2, in which the second image IM2 (i.e., a still image) is displayed, as a second operating frequency lower than the first operating frequency. The first operating frequency may be 120 Hz, and the second operating frequency may be 1 Hz.

The first operating frequency and the second operating frequency may be variously changed.

In the multi-frequency mode MFD, when the first operating frequency is 120 Hz and the second operating frequency is 1 Hz, the first image IM1 may be displayed in the first display area DA1 of the display device DD during each of the first to 120th frames F1 to F120 for 1 second. The second image IM2 may be displayed in the second display area DA2 only during the first frame F1, and an image may not be displayed during the remaining frames F2 to F120.

FIG. 3B illustrates that, in the multi-frequency mode MFD, the first operating frequency is 120 Hz and the second operating frequency is 1 Hz, but the present disclosure is not limited thereto. The second operating frequency may be variously changed to a frequency lower than the first operating frequency, for example, 60 Hz, 30 Hz, 10 Hz, or the like in another embodiment.

Figure 4:
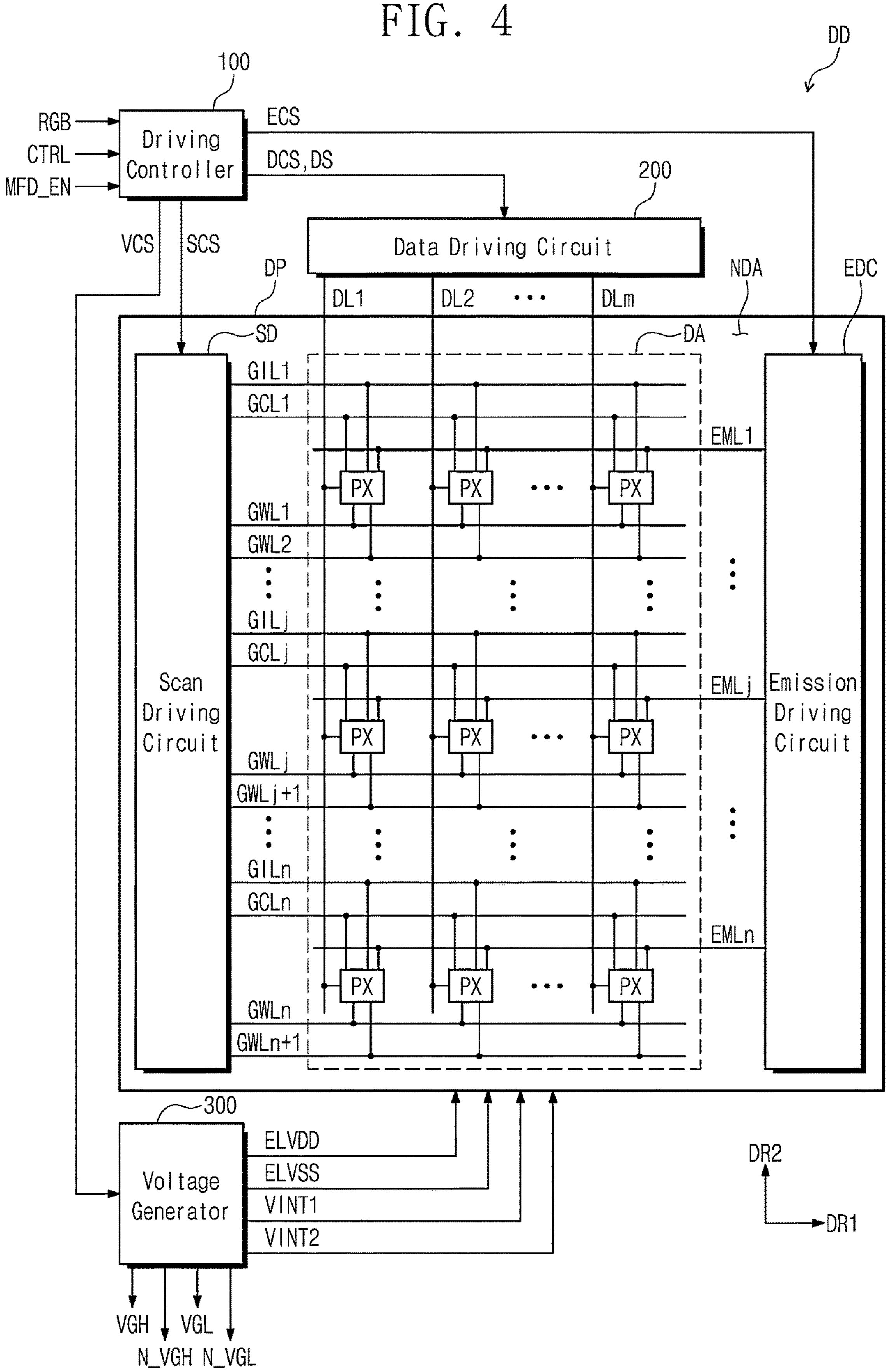
FIG. 4 is a block diagram of a display device, according to an embodiment of the present disclosure.

FIG. 4 is a block diagram of a display device, according to an embodiment of the present disclosure.

Referring to FIG. 4, a display device DD includes a display panel DP, a driving controller 100, a data driving circuit 200, and a voltage generator 300.

The driving controller 100 receives an image signal RGB, a control signal CTRL, and a mode signal MFD_EN. The driving controller 100 generates an image data signal DS by converting a data format of the image signal RGB so as to be suitable for the interface specification of the data driving circuit 200. The driving controller 100 outputs a scan control signal SCS, a data control signal DCS, an emission control signal ECS, and a voltage control signal VCS.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later. The data signals are analog voltages corresponding to grayscale levels of the image data signal DS.

The voltage generator 300 generates voltages for operations of the display panel DP in response to the voltage control signal VCS from the driving controller 100. In an embodiment, the voltage generator 300 generates a first driving voltage ELVDD, a second driving voltage ELVSS, a first initialization voltage VINT1, a second initialization voltage VINT2, a first voltage N_VGH, a second voltage N_VGL, a third voltage VGH, and a fourth voltage VGL.

The display panel DP includes scan lines GIL1 to GILn, GCL1 to GCLn, and GWL1 to GWLn+1, emission control lines EML1 to EMLn, the data lines DL1 to DLm, and the pixels PX. The display panel DP may further include a scan driving circuit SD and an emission driving circuit EDC. In an embodiment, the scan driving circuit SD may be arranged on a first side of the display panel DP. The scan lines GIL1 to GILn, GCL1 to GCLn, and GWL1 to GWLn+1 extend from the scan driving circuit SD in the first direction DR1.

The emission driving circuit EDC is arranged on a second side of the display panel DP. The emission control lines EML1 to EMLn extend from the emission driving circuit EDC in a direction opposite to the first direction DR1.

The scan lines GIL1 to GILn, GCL1 to GCLn, and GWL1 to GWLn+1 and the emission control lines EML1 to EMLn are arranged to be spaced from one another in the second direction DR2. The data lines DL1 to DLm extend from the data driving circuit 200 in a direction opposite to the second direction DR2, and are arranged spaced from one another in the first direction DR1.

In the example shown in FIG. 4, the scan driving circuit SD and the emission driving circuit EDC are arranged to face each other with the pixels PX interposed therebetween, but the present disclosure is not limited thereto. In another embodiment, for example, the scan driving circuit SD and the emission driving circuit EDC may be positioned adjacent to each other on one of the first side and the second side of the display panel DP. In an embodiment, the scan driving circuit SD and the emission driving circuit EDC may be implemented with one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. In an embodiment, for example, as shown in FIG. 4, pixels PX in a first row may be connected to the scan lines GIL1, GCL1, GWL1, and GWL2 and the emission control line EML1. Furthermore, pixels PX in the j-th row may be connected to the scan lines GILj, GCLj, GWLj, and GWLj+1 and the emission control line EMLj.

Each of the plurality of pixels PX includes a light emitting element ED (see FIG. 5) and a pixel circuit PXC (see FIG. 5) for controlling the light emission of the light emitting element ED. The pixel circuit PXC may include one or more transistors and one or more capacitors. The scan driving circuit SD and the emission driving circuit EDC may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. Also, the scan driving circuit SD receives the first voltage N_VGH, the second voltage N_VGL, the third voltage VGH, and the fourth voltage VGL that are generated by the voltage generator 300. The scan driving circuit SD may output scan signals to the scan lines GIL1 to GILn, GCL1 to GCLn, and GWL1 to GWLn+1 in response to the scan control signal SCS.

The circuit configuration and operation of the scan driving circuit SD will be described in detail later.

The driving controller 100 according to an embodiment may determine the operating mode in response to the mode signal MFD_EN. In an embodiment, the mode signal MFD_EN may indicate whether the operating mode is a single-frequency mode or a multi-frequency mode. In an embodiment, the mode signal MFD_EN may include information about a start location (a first scan line of a second display area DA2) of the second display area DA2 (see FIG. 3B) in the multi-frequency mode. In an embodiment, the mode signal MFD_EN may be provided from a host processor (e.g., a graphics processor or an application processor).

The driving controller 100 according to an embodiment may determine the operating mode based on the image signal RGB and the control signal CTRL without receiving the mode signal MFD_EN from the outside.

The driving controller 100 may determine the operating frequency of the display panel DP in the first display area DA1 (see FIG. 3B) and the second display area DA2 (see FIG. 3B) depending on the determined operating mode.

In an embodiment, when the determined operating mode is a single-frequency mode, as shown in FIG. 3A, the driving controller 100 drives the first display area DA1 and the second display area DA2 at a normal frequency (e.g., 120 Hz).

When the determined operating mode is a multi-frequency mode, the driving controller 100 may compart the display panel DP into the first display area DA1 and the second display area DA2, and may set an operating frequency of each of the first display area DA1 and the second display area DA2. In an embodiment, for example, in the multi-frequency mode, the driving controller 100 may drive the first display area DA1 at a first operating frequency (e.g., 120 Hz) and may drive the second display area DA2 at a second operating frequency (e.g., 1 Hz).

The driving controller 100 according to an embodiment of the present disclosure may change the frequency of a clock signal included in the scan control signal SCS depending on an operating mode. The operation of the driving controller 100 will be described in detail later.

Figure 5:
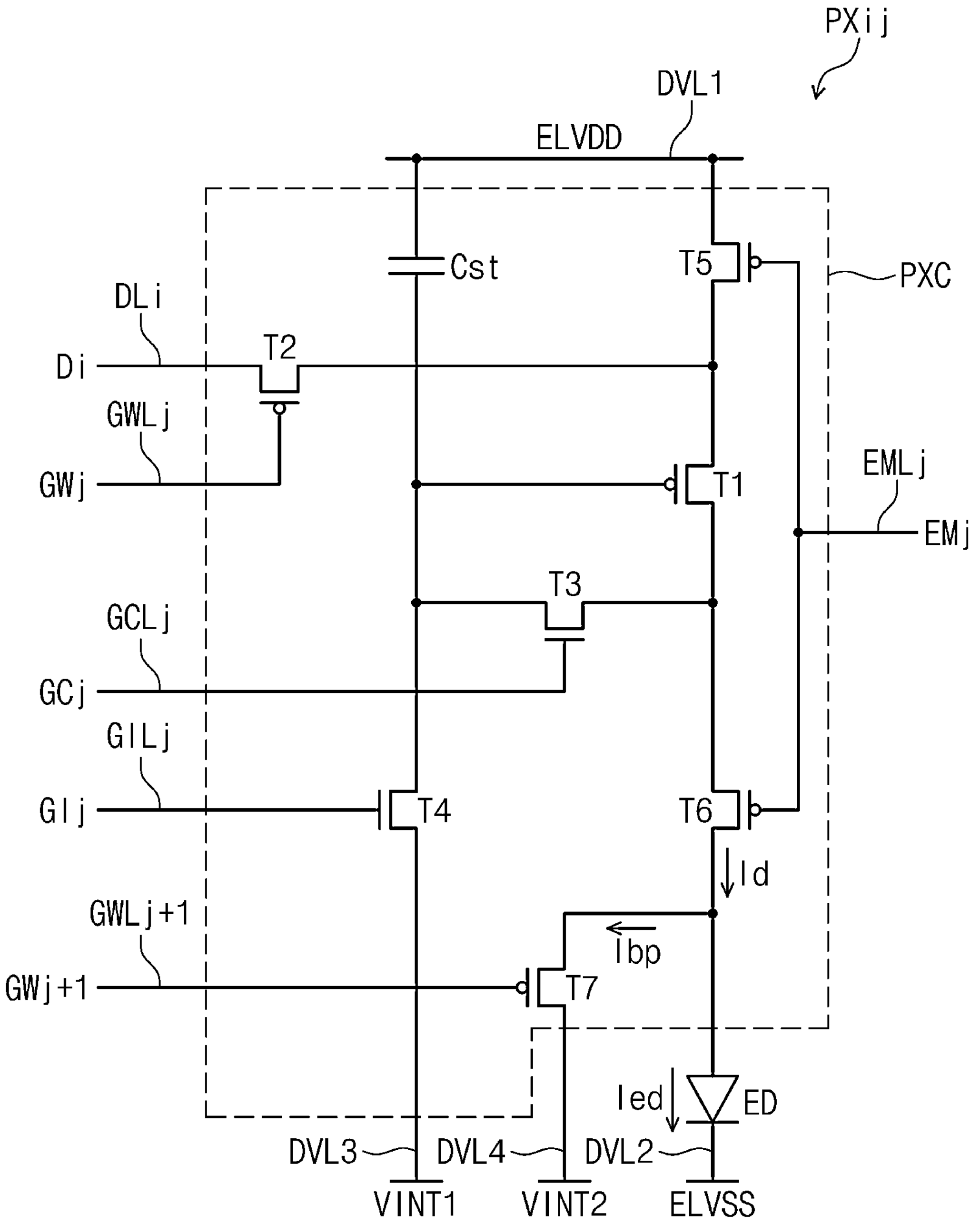
FIG. 5 is a circuit diagram of a pixel, according to an embodiment of the present disclosure.

FIG. 5 is a circuit diagram of a pixel, according to an embodiment of the present disclosure.

FIG. 5 illustrates an equivalent circuit diagram of a pixel PXij connected to the i-th data line DLi among the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th emission control line EMLj among the emission control lines EML1 to EMLn, which are illustrated in FIG. 4.

Each of the plurality of pixels PX shown in FIG. 4 may have the same circuit configuration as the equivalent circuit diagram of the pixel PXij shown in FIG. 5.

Referring to FIG. 5, the pixel PXij of a display device according to an embodiment includes a pixel circuit PXC and at least one light emitting element ED. In an embodiment, the light emitting element ED may be a light emitting diode. In an embodiment, it is described that the one pixel PXij includes the one light emitting element ED. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors by using an oxide semiconductor as a semiconductor layer. Each of the first, second, fifth, sixth, and seventh transistors T1, T2, T5, T6, and T7 is a P-type transistor having a low-temperature polycrystalline silicon ("LTPS") semiconductor layer. However, the present disclosure is not limited thereto, and all of the first to seventh transistors T1 to T7 may be P-type transistors or N-type transistors in another embodiment. In an embodiment, at least one of the first to seventh transistors T1 to T7 may be an N-type transistor, and the remaining transistors may be P-type transistors. Moreover, the circuit configuration of a pixel according to an embodiment of the present disclosure is not limited to FIG. 5. The pixel circuit PXC illustrated in FIG. 5 is only an example. For example, the configuration of the pixel circuit PXC may be modified and implemented.

The scan lines GILj, GCLj, GWLj, and GWLj+1 may deliver scan signals GIj, GCj, GWj, and GWj+1, respectively. The emission control line EMLj may deliver an emission control signal EMj. The data line DLi delivers a data signal Di. The data signal Di may have a voltage level corresponding to the image signal RGB input to the display device DD (see FIG. 4). First to fourth driving voltage lines DVL1, DVL2, DVL3, and DVL4 may deliver the first driving voltage ELVDD, the second driving voltage ELVSS, the first initialization voltage VINT1, and the second initialization voltage VINT2, respectively.

The first transistor T1 includes a first electrode connected to the first driving voltage line DVL1 via the fifth transistor T5, a second electrode electrically connected to an anode of the light emitting element ED via the sixth transistor T6, and a gate electrode connected to one end of the capacitor Cst. The first transistor T1 may receive the data signal Di delivered through the data line DLi depending on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the scan line GWLj. The second transistor T2 may be turned on depending on the scan signal GWj received through the scan line GWLj and then may deliver the data signal Di delivered from the data line DLi to the first electrode of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third driving voltage line DVL3 through which the first initialization voltage VINT1 is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by supplying the first initialization voltage VINT1 to the gate electrode of the first transistor T1.

The fifth transistor T5 includes a first electrode connected to the first driving voltage line DVL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 may be simultaneously turned on depending on the emission control signal EMj received through the emission control line EMLj. In this way, the first driving voltage ELVDD may be compensated through the first transistor T1 thus diode-connected and may be supplied to the light emitting element ED.

The seventh transistor T7 includes a first electrode connected to the second electrode of the sixth transistor T6, a second electrode connected to the fourth driving voltage line DVL4, and a gate electrode connected to the scan line GWLj+1. The seventh transistor T7 is turned on depending on the scan signal GWj+1 received through the scan line GWLj+1, and bypasses a current of the anode of the light emitting element ED to the fourth driving voltage line DVL4.

As described above, one end of the capacitor Cst is connected to the gate electrode of the first transistor T1, and the other end of the capacitor Cst is connected to the first driving voltage line DVL1. The cathode of the light emitting element ED may be connected to the second driving voltage line DVL2 that delivers the second driving voltage ELVSS. A structure of the pixel PXij according to an embodiment is not limited to the structure shown in FIG. 5. The number of transistors included in the one pixel PXij, the number of capacitors included in the one pixel PXij, and the connection relationship thereof may be variously modified.

Figure 6A:
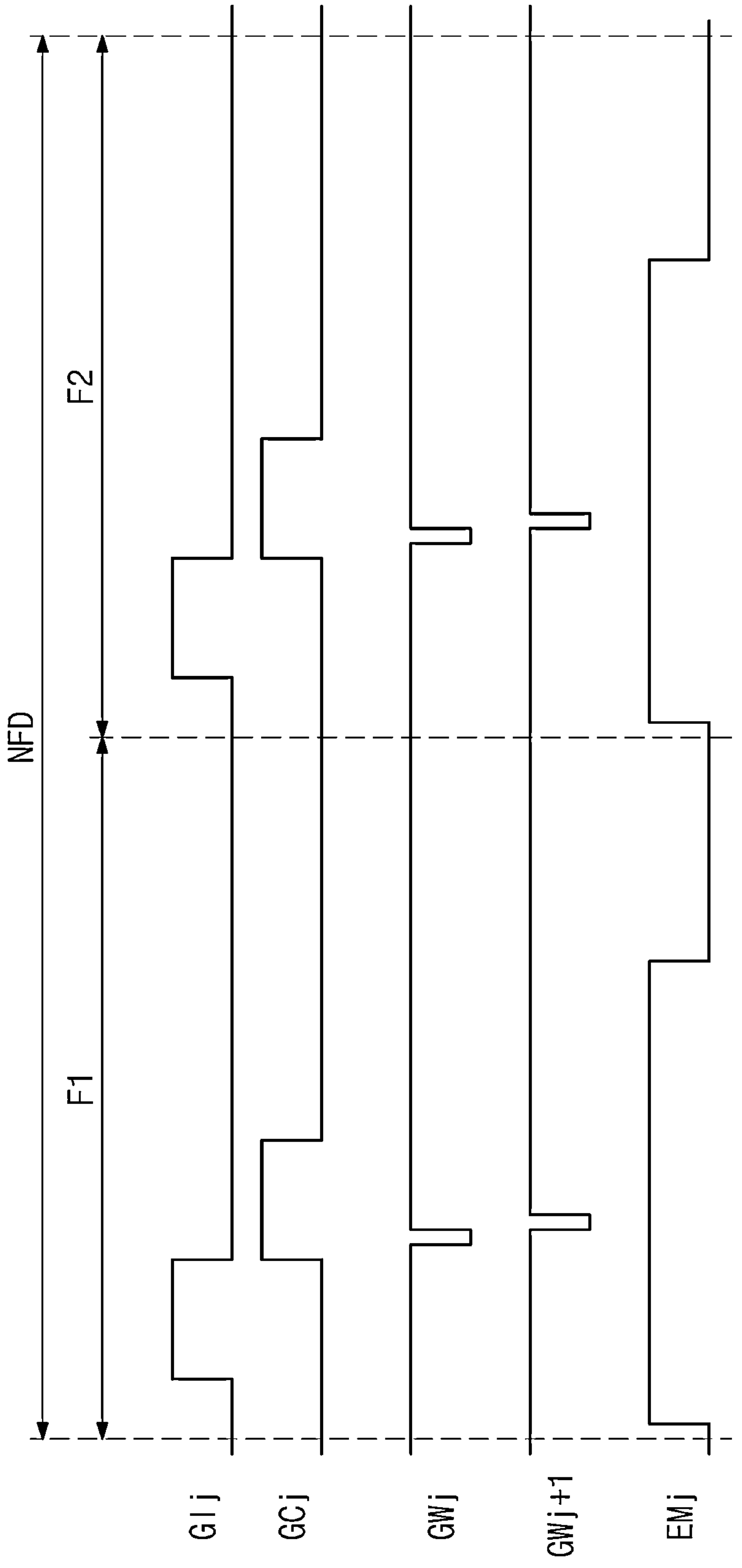
FIG. 6A is a timing diagram for describing an operation of a pixel shown in FIG. 5 in a single-frequency mode.

FIG. 6A is a timing diagram for describing an operation of a pixel shown in FIG. 5 in a single-frequency mode.

Referring to FIGS. 5 and 6A, during an initialization interval in the first frame F1 of the single-frequency mode NFD, the scan signal GIj having a high level is provided through the scan line GILj. When the fourth transistor T4 is turned on in response to the scan signal GIj having a high level, the first initialization voltage VINT1 is supplied to the gate electrode of the first transistor T1 through the fourth transistor T4 so as to initialize the first transistor T1.

Next, when the scan signal GCj having a high level is supplied through the scan line GCLj during a data programming and compensation interval, the third transistor T3 is turned on. The first transistor T1 is diode-connected by the third transistor T3 thus turned on and is forward-biased. At this time, when the scan signal GWj having a low level is supplied through the scan line GWLj, the second transistor T2 is turned on. In the case, a compensation voltage, which is obtained by reducing the voltage of the data signal Di supplied from the data line DLi by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are applied to opposite ends of the capacitor Cst, respectively, a charge corresponding to a difference between the first driving voltage ELVDD and the compensation voltage may be stored in the capacitor Cst.

In the meantime, the seventh transistor T7 is turned on in response to the scan signal GWj+1 having a low level that is delivered through the scan line GWLj+1. A part of the driving current Id may be drained through the seventh transistor T7 as the bypass current Ibp.

When the light emitting element ED emits light under the condition that a minimum current of the first transistor T1 flows as a driving current Id for the purpose of displaying a black image, the black image may not be normally displayed. Accordingly, the seventh transistor T7 in the pixel PXij according to an embodiment of the present disclosure may drain (or disperse) a part of the minimum current of the first transistor T1 to a current path, which is different from a current path to the light emitting element ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current Id (e.g., a current of 10 pA or less) is delivered to the light emitting element ED, with the first transistor T1 turned off, an image of black luminance is expressed. When the minimum driving current Id for displaying a black image flows, the influence of a bypass transfer of the bypass current Ibp may be great; on the other hand, when a large driving current Id for displaying an image such as a normal image or a white image flows, there may be almost no influence of the bypass current Ibp. Accordingly, when a driving current Id for displaying a black image flows, a light emitting current led of the light emitting element ED, which corresponds to a result of subtracting the bypass current Ibp drained through the seventh transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GWj+1 having a low level, but is not necessarily limited thereto.

Next, during a light emitting interval, the emission control signal EMj supplied from the emission control line EMLj is changed from a high level to a low level. During a light emitting interval, the fifth transistor T5 and the sixth transistor T6 are turned on by the emission control signal EMj having a low level. In this case, the driving current Id according to a voltage difference between the gate voltage of the gate electrode of the first transistor T1 and the first driving voltage ELVDD is generated and supplied to the light emitting element ED through the sixth transistor T6, and the light emitting current led flows through the light emitting element ED.

During the second frame F2 continuous with the first frame F1 of the single-frequency mode NFD, the pixel PXij may operate in the same manner as the first frame F1.

Figure 6B:
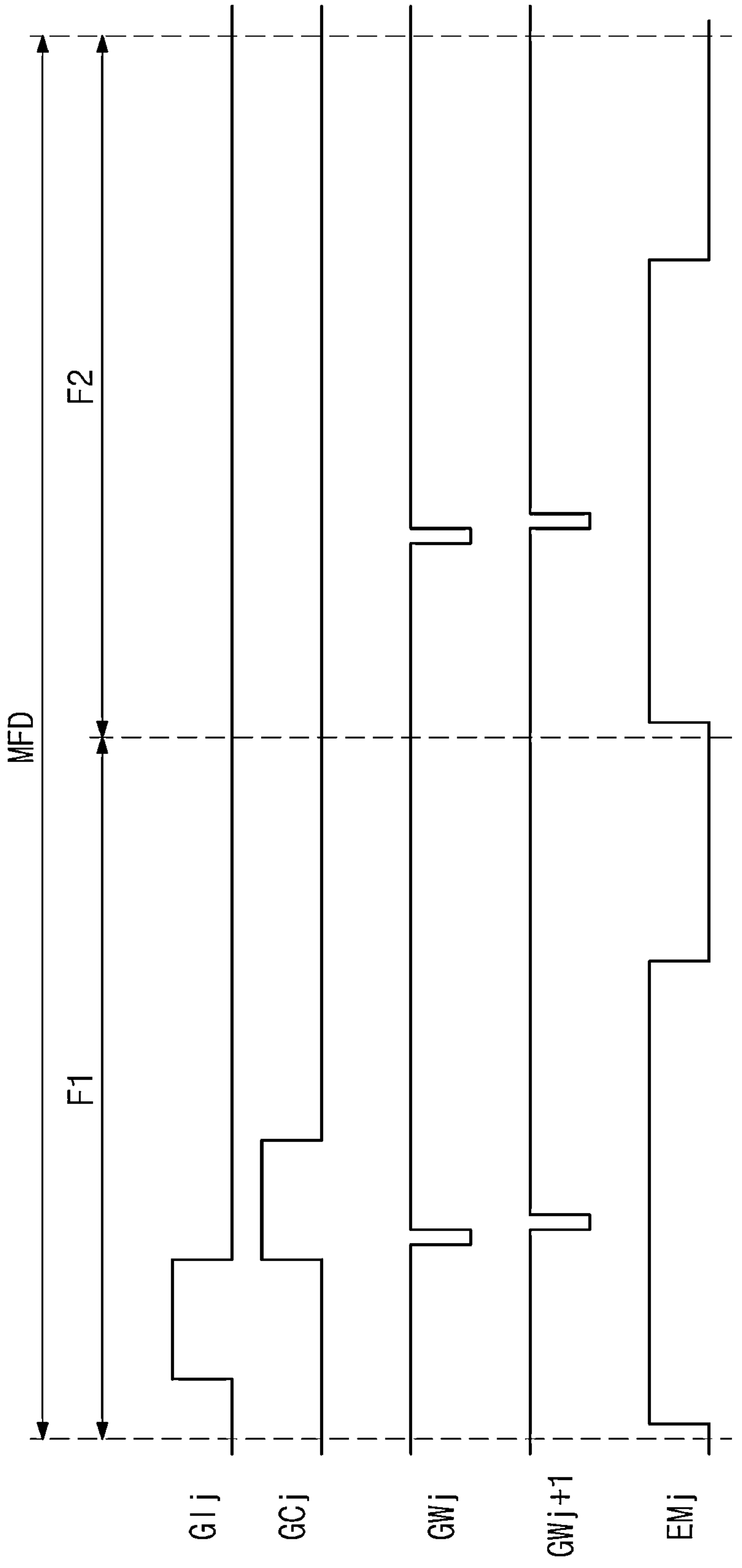
FIG. 6B is a timing diagram for describing an operation of a pixel shown in FIG. 5 in a multi-frequency mode.

FIG. 6B is a timing diagram for describing an operation of a pixel shown in FIG. 5 in a multi-frequency mode.

Referring to FIGS. 5 and 6B, during the first frame F1 of the multi-frequency mode MFD, the pixel PXij may operate in the same manner as the first frame F1 of the single-frequency mode NFD.

During the second frame F2 of the multi-frequency mode MFD, the scan signals GIj and GCj are maintained at an inactive level (i.e., a low level).

When the scan signal GWj having a low level is supplied through the scan line GWLj, the second transistor T2 is turned on. Then, the data signal Di supplied from the data line DLi may be provided to the first electrode of the first transistor T1. The data signal Di supplied from the data line DLi during the first frame F1 of the multi-frequency mode MFD may be at a bias voltage level for initializing the first transistor T1.

When the scan signal GWj+1 having a low level is provided through the scan line GWLj+1, the seventh transistor T7 is turned on. The anode of the light emitting element ED may be initialized by the seventh transistor T7.

Next, during a light emitting interval, the emission control signal EMj supplied from the emission control line EMLj is changed from a high level to a low level. During a light emitting interval, the fifth transistor T5 and the sixth transistor T6 are turned on by the emission control signal EMj having a low level. The driving current Id according to a voltage difference between the gate voltage of the gate electrode of the first transistor T1 and the first driving voltage ELVDD is generated by the charge charged in the capacitor Cst and is supplied to the light emitting element ED through the sixth transistor T6, and the light emitting current Ted flows through the light emitting element ED. Accordingly, even though the data signal Di is not provided during the second frame F2 of the multi-frequency mode MFD, the light emitting element ED may emit light by the charge charged in the capacitor Cst.

Figure 7:
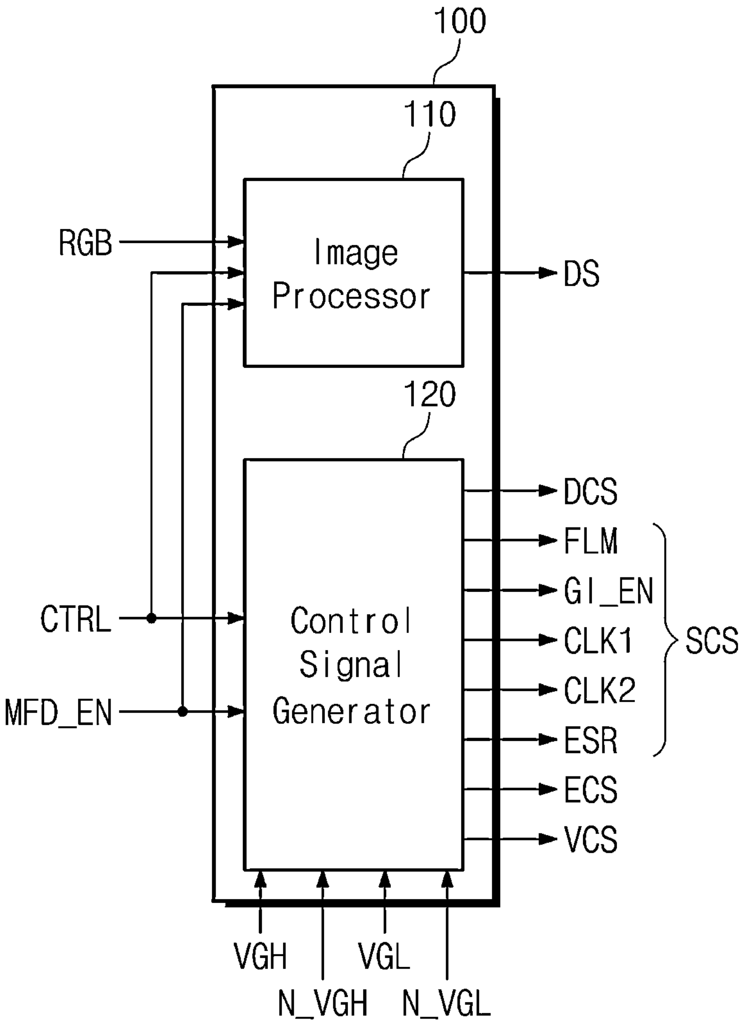
FIG. 7 is a block diagram of a driving controller, according to an embodiment of the present disclosure.

FIG. 7 is a block diagram of a driving controller, according to an embodiment of the present disclosure.

Referring to FIG. 7, the driving controller 100 includes an image processor 110 and a control signal generator 120.

The image processor 110 generates the image data signal DS obtained by converting the data format of the image signal RGB, in response to the control signal CTRL and the mode signal MFD_EN.

The control signal generator 120 outputs the data control signal DCS, the scan control signal SCS, the emission control signal ECS, and the voltage control signal VCS in response to the control signal CTRL and the mode signal MFD_EN.

The scan control signal SCS includes a start signal FLM, a scan-enable signal GI_EN, a first clock signal CLK1, a second clock signal CLK2, and an off-control signal ESR. The scan-enable signal GI_EN may be a signal indicating a start time of the second display area DA2 in the multi-frequency mode MFD shown in FIG. 3B.

In an embodiment, the control signal generator 120 may change pulse widths of the first clock signal CLK1 and the second clock signal CLK2 in response to the mode signal MFD_EN.

In an embodiment, the control signal generator 120 may change amplitudes of the first clock signal CLK1 and the second clock signal CLK2 depending on voltage levels of the first voltage N_VGH and the second voltage N_VGL.

In an embodiment, the control signal generator 120 may change the pulse widths and amplitudes of the first clock signal CLK1 and the second clock signal CLK2 depending on voltage levels of the mode signal MFD_EN, the first voltage N_VGH, and the second voltage N_VGL.

Although not shown, the control signal generator 120 may further generate clock signals provided to the scan driving circuit SD depending on voltage levels of the third voltage VGH and the fourth voltage VGL. The clock signals generated depending on the voltage levels of the third voltage VGH and the fourth voltage VGL may be clock signals for generating the scan signals GW1 to GWn+1. Furthermore, the control signal generator 120 may further generate clock signals provided to the emission driving circuit EDC depending on voltage levels of the third voltage VGH and the fourth voltage VGL. The clock signals generated depending on the voltage levels of the third voltage VGH and the fourth voltage VGL may be clock signals for generating the emission control signals EM1 to EMn.

Figure 8:
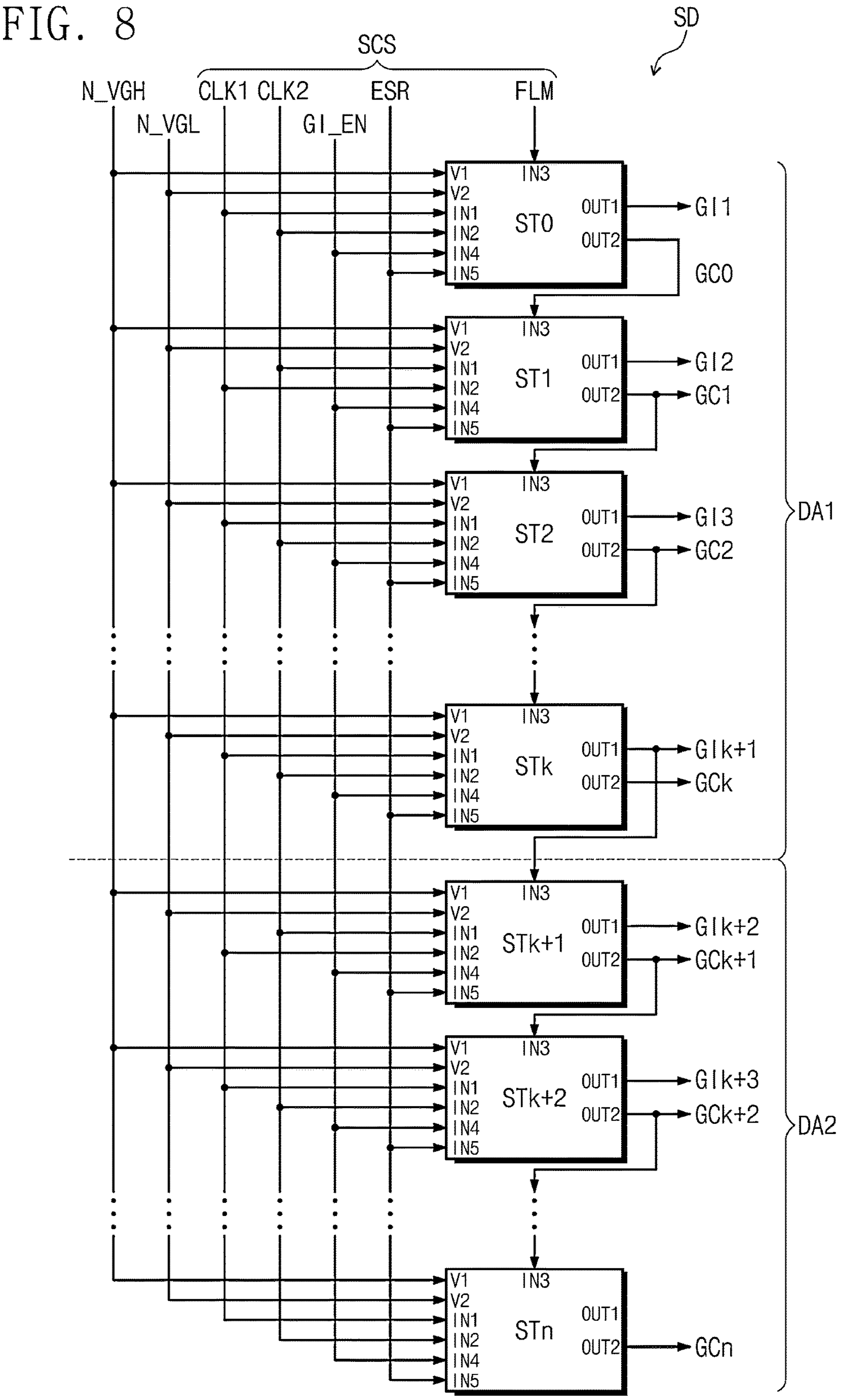
FIG. 8 is a block diagram of a scan driving circuit, according to an embodiment of the present disclosure.

FIG. 8 is a block diagram of a scan driving circuit, according to an embodiment of the present disclosure.

Referring to FIG. 8, the scan driving circuit SD includes driving stages ST0 to STn. Each of the driving stages ST0 to STn receives the scan control signal SCS from the driving controller 100 illustrated in FIG. 4. The scan control signal SCS includes the start signal FLM, the first clock signal CLK1, the second clock signal CLK2, the scan-enable signal GI_EN, and the off-control signal ESR.

Each of the driving stages ST0 to STn includes first to fifth input terminals IN1, IN2, IN3, IN4, and IN5 for receiving the first clock signal CLK1, the second clock signal CLK2, the start signal FLM, the scan-enable signal GI_EN, and the off-control signal ESR, respectively.

Each of the driving stages ST0 to STn further includes a first voltage terminal V1 for receiving the first voltage N_VGH and a second voltage terminal V2 for receiving the second voltage N_VGL. The first voltage N_VGH and the second voltage N_VGL may be provided from the voltage generator 300 illustrated in FIG. 4.

The scan-enable signal GI_EN may be a signal for masking scan signals (e.g., initialization scan signals), which are supplied to the second display area DA2, to a predetermined level. As an example of the present disclosure, the scan-enable signal GI_EN may be provided to the driving stages ST0 to STn. In another embodiment, the scan-enable signal GI_EN may be provided to the fourth input terminal IN4 of some of the driving stages ST0 to STn. The first voltage N_VGH may be provided to the fourth input terminals IN4 of another some of the driving stages ST0 to STn.

In an embodiment, the driving stages ST0 to STn may output the scan signals GC1 to GCn provided to the scan lines GCL1 to GCLn and the scan signals GI1 to GIn provided to the scan lines GIL1 to GILn shown in FIG. 4.

In an embodiment, each of the driving stages ST0 to STn may include a first output terminal OUT1 for outputting a corresponding scan signal among the scan signals GC0 to GCn and a second output terminal OUT2 for outputting a corresponding scan signal among the scan signals GI1 to GIn.

In an embodiment, the k-th driving stage STk may output the (k+1)-th scan signal GIk+1 through the first output terminal OUT1 and may output the k-th scan signal GCk through the second output terminal OUT2.

Here, the driving stages ST0 to STk may correspond to the first display area DA1. The driving stages STk+1 to STn may correspond to the second display area DA2. Here, 'n' and 'k' are integers, each of which is not less than 1, and 'n' is greater than 'k'.

Although not shown, the scan driving circuit SD may further include driving stages for driving the scan lines GWL1 to GWLn+1 shown in FIG. 4.

The driving stage ST0, which is the first driving stage among the driving stages ST0 to STn, may receive the start signal FLM as a carry signal through the third input terminal IN3. Each of the driving stages ST1 to STn receives the carry signal from the previous driving stage. In an embodiment, for example, the driving stage ST1 receives the carry signal from the driving stage ST0, and the driving stage ST2 receives the carry signal from the driving stage ST1.

In an embodiment, the driving stages ST1 to STk and STk+2 to STn receive the scan signals GC0 to GCk−1 and GCk+1 to GCn−1 output from the previous driving stages ST0 to STk−1 and STk+1 to STn−1. The driving stage STk+1 receives the scan signal GIk+1 output from the previous driving stage STk as the carry signal. However, the present disclosure is not limited thereto. In another embodiment, for example, the driving stages ST1 to STn may receive one of the scan signals GC0 to GCn−1 and the scan signals GI1 to GIn−1, which are output from the previous driving stage, as a carry signal.

Figure 9:
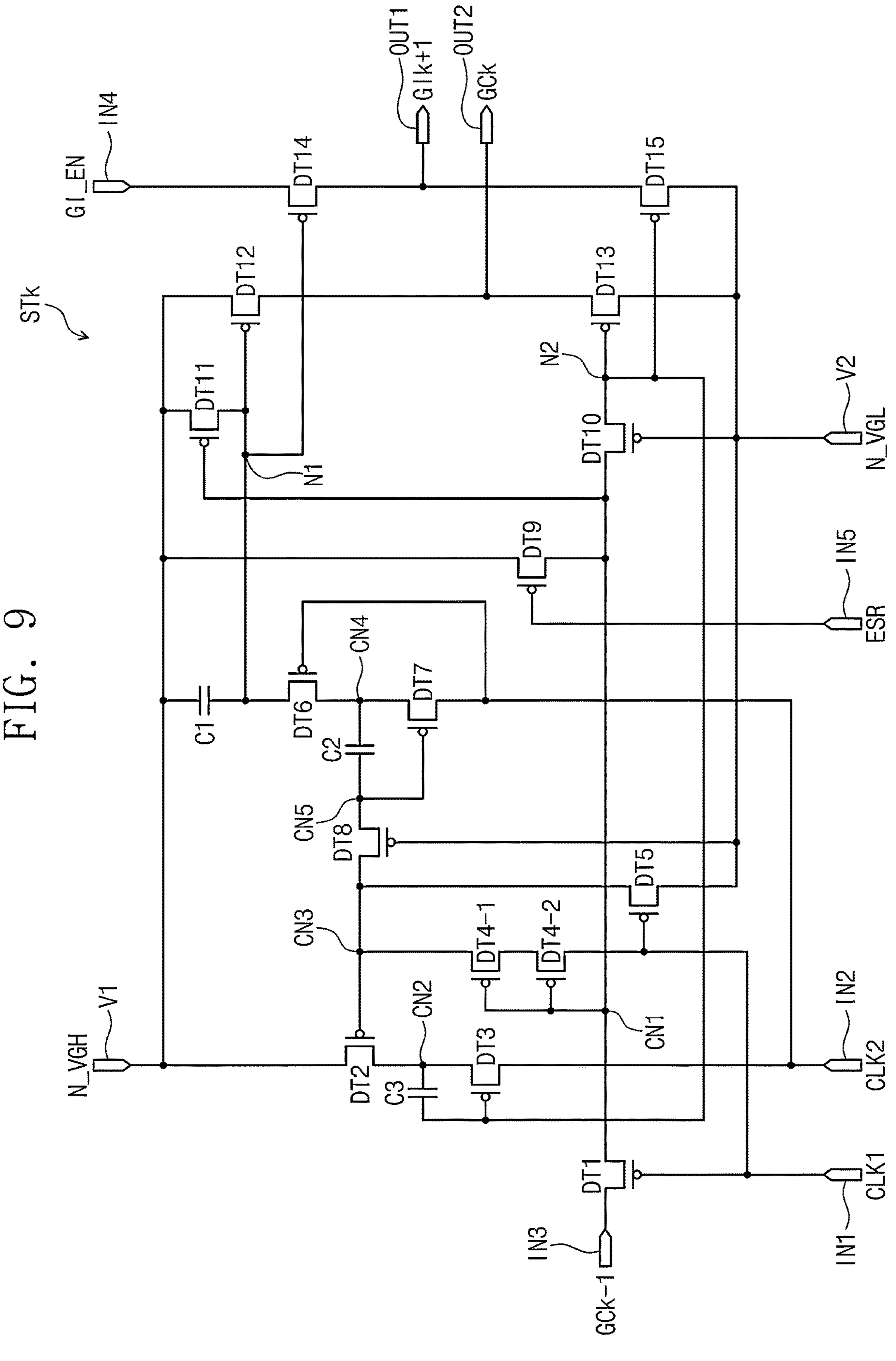
FIG. 9 is a circuit diagram illustrating a k-th driving stage among driving stages, according to an embodiment of the present disclosure.

FIG. 9 is a circuit diagram illustrating a k-th driving stage among driving stages, according to an embodiment of the present disclosure.

Referring to FIG. 9, the driving stage STk includes the first to fifth input terminals IN1, IN2, IN3, IN4, and IN5, the first and second voltage terminals V1 and V2, and the first and second output terminals OUT1 and OUT2. The driving stage STk further includes driving transistors DT1 to DT15 and driving capacitors C1 to C3.

The first driving transistor DT1 is connected between the third input terminal IN3 and a first control node CN1 and includes a gate electrode connected to the first input terminal IN1.

The second driving transistor DT2 is connected between the first voltage terminal V1 and a second control node CN2, and includes a gate electrode connected to a third control node CN3. The third driving transistor DT3 is connected between a second control node CN2 and the second input terminal IN2, and includes a gate electrode connected to a second node N2.

The fourth driving transistors DT4-1 and DT4-2 are connected between the third control node CN3 and the first input terminal IN1, and include gate electrodes connected to the first control node CN1. In an embodiment, the fourth driving transistors DT4-1 and DT4-2 may be connected in series between the third control node CN3 and the first input terminal IN1.

The fifth driving transistor DT5 is connected between the third control node CN3 and the second voltage terminal V2, and includes a gate electrode connected to the first input terminal IN1. The sixth driving transistor DT6 is connected between a first node N1 and a fourth control node CN4 and includes a gate electrode connected to the second input terminal IN2. The seventh driving transistor DT7 is connected between the fourth control node CN4 and the second input terminal IN2 and includes a gate electrode connected to a fifth control node CN5.

The eighth driving transistor DT8 is connected between the third control node CN3 and the fifth control node CN5 and includes a gate electrode connected to the second voltage terminal V2.

The ninth driving transistor DT9 is connected between the first voltage terminal V1 and the first control node CN1 and includes a gate electrode connected to the fifth input terminal IN5.

The tenth driving transistor DT10 is connected between the first control node CN1 and the second node N2 and includes a gate electrode connected to the second voltage terminal V2.

The eleventh driving transistor DT11 is connected between the first voltage terminal V1 and the first node N1 and includes a gate electrode connected to the first control node CN1.

The twelfth driving transistor DT12 is connected between the first voltage terminal V1 and the second output terminal OUT2 and includes a gate electrode connected to the first node N1. The thirteenth driving transistor DT13 is connected between the second output terminal OUT2 and the second voltage terminal V2 and includes a gate electrode connected to the second node N2.

The fourteenth driving transistor DT14 is connected between the fourth input terminal IN4 and the first output terminal OUT1 and includes a gate electrode connected to the first node N1. The fifteenth driving transistor DT15 is connected between the first output terminal OUT1 and the second voltage terminal V2 and includes a gate electrode connected to the second node N2.

The first driving capacitor C1 is connected between the first voltage terminal V1 and the first node N1. The second driving capacitor C2 is connected between the fourth control node CN4 and the fifth control node CN5. The third driving capacitor C3 is connected between the second control node CN2 and the second node N2.

The first input terminal IN1 receives the first clock signal CLK1, and the second input terminal IN2 receives the second clock signal CLK2. The first clock signal CLK1 and the second clock signal CLK2 may be complementary signals. When the first input terminal IN1 of the k-th driving stage STk receives the first clock signal CLK1 and the second input terminal IN2 of the k-th driving stage STk receives the second clock signal CLK2, the first input terminal IN1 of the (k+1)-th driving stage STk+1 may receive the second clock signal CLK2, and the second input terminal IN2 may receive the first clock signal CLK1.

The third input terminal IN3 may receive the scan signal GCk−1 output from the previous driving stage STk−1 as a carry signal.

The fourth input terminal IN4 receives the scan-enable signal GI_EN. The scan-enable signal GI_EN may be a signal for masking the signal level of the scan signal GIk+1 to a low level. In a single-frequency mode, the scan-enable signal GI_EN may be maintained at a high level.

The fifth input terminal IN5 receives the off-control signal ESR. While the off-control signal ESR is at a low level, the signal level of the second node N2 may be maintained at a high level.

Figure 10A:
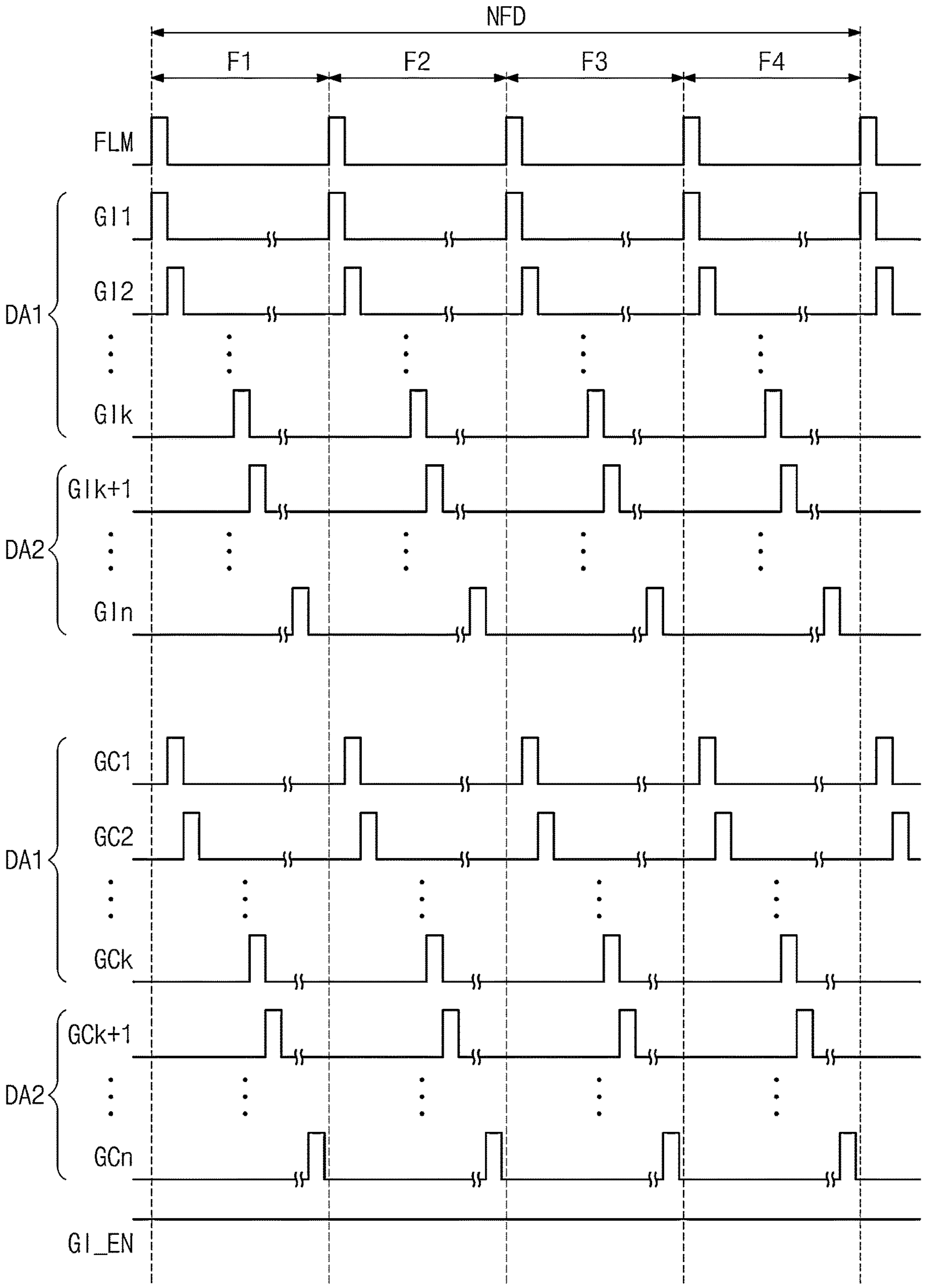
FIG. 10A illustrates the scan signals output from a scan driving circuit shown in FIG. 4 in a single-frequency mode.

FIG. 10A illustrates the scan signals GI1 to GIn and the scan signals GC1 to GCn output from the scan driving circuit SD shown in FIG. 4 in a single-frequency mode.

Figure 10B:
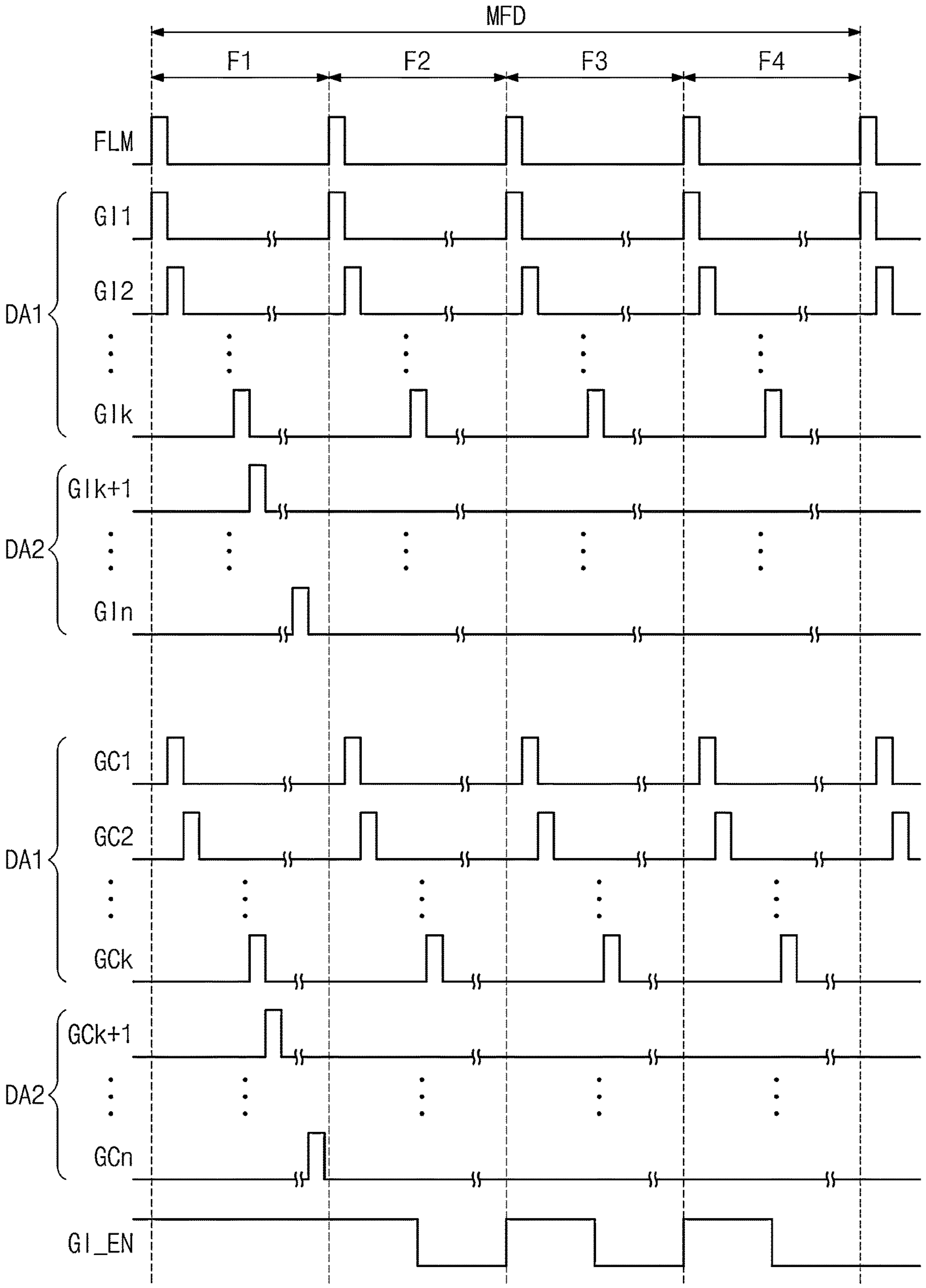
FIG. 10B illustrates the scan signals output from a scan driving circuit shown in FIG. 4 in a multi-frequency mode.

FIG. 10B illustrates the scan signals GI1 to GIn and the scan signals GC1 to GCn output from the scan driving circuit SD shown in FIG. 4 in a multi-frequency mode.

FIGS. 10A and 10B illustrate that the first display area DA1 shown in FIG. 1 corresponds to the scan signals GI1 to GIk and the scan signals GC1 to GCk, and the second display area DA2 shown in FIG. 1 corresponds to the scan signals GIk+1 to GIn and the scan signals GCk+1 to GCn, as an example. The number of scan signals corresponding to the first display area DA1 and the number of scan signals corresponding to the second display area DA2 may be variously changed.

First of all, referring to FIGS. 4 and 10A, when the operating frequency is a first operating frequency (e.g., 120 Hz) during the single-frequency mode NFD, the scan driving circuit SD sequentially activates the scan signals GI1 to GIn to a high level during each of the first to fourth frames F1 to F4, and sequentially activates the scan signals GC1 to GCn to a high level during each of the first to fourth frames F1 to F4. Only the scan signals GI1 to GIn and the scan signals GC1 to GCn are shown in FIG. 10A. However, the scan signals GW1 to GWn+1 and the emission control signals EM1 to EMn may also be sequentially activated to low levels during each of the frames F1, F2, F3, and F4 of the single-frequency mode NFD.

FIG. 10A illustrates only the first to fourth frames F1 to F4. However, the scan signals GI1 to GIn and the scan signals GC1 to GCn may be sequentially activated during each of the fifth to 120th frames F5 to F120 of the single-frequency mode NFD shown in FIG. 3A in the same manner as the first to fourth frames F1 to F4 illustrated in FIG. 10A.

As such, in the single-frequency mode NFD, the frequency of each of the scan signals GI1 to GIn and the scan signals GC1 to GCn may be the first operating frequency (e.g., 120 Hz).

In the single-frequency mode NFD, the scan-enable signal GI_EN is maintained at a high level.

Referring to FIGS. 4 and 10B, during the first frame F1 of the multi-frequency mode MFD, the scan signals GI1 to GIn and the scan signals GC1 to GCn are sequentially activated to high levels.

Although not shown in FIG. 10B, during the first frame F1 of the multi-frequency mode MFD, the scan signals GW1 to GWn+1 and the emission control signals EM1 to EMn may be sequentially activated to low levels.

During each of the second to fourth frames F2 to F4, the scan signals GI1 to GIk are sequentially activated to high levels, and the scan signals GIk+1 to GIn are maintained at inactive levels (e.g., low levels).

Furthermore, during each of the second to fourth frames F2 to F4, the scan signals GC1 to GCk are sequentially activated to high levels, and the scan signals GCk+1 to GCn are maintained at inactive levels (e.g., low levels).

Although not shown in FIG. 10B, as described in FIG. 6B, during each of the second to fourth frames F2 to F4 of the multi-frequency mode MFD, the scan signals GW1 to GWn+1 may be sequentially activated to low levels. Likewise, during each of the second to fourth frames F2 to F4 of the multi-frequency mode MFD, the emission control signals EM1 to EMn may be sequentially activated to low levels.

FIG. 10B illustrates only the four frames F1, F2, F3, and F4. However, during each of the fifth to 120th frames F5 to F120 of the multi-frequency mode MFD shown in FIG. 3B, the scan signals GIk+1 to GIn and the scan signals GCk+1 to GCn may be maintained at inactive levels in the same manner as the second to fourth frames F2 to F4 shown in FIG. 10B.

As such, during the multi-frequency mode MFD, each frequency of each of the scan signals GI1 to GIn and the scan signals GC1 to GCn may be a second operating frequency (e.g., 1 Hz) lower than the first operating frequency (e.g., 120 Hz).

As the scan signals GIk+1 to GIn and the scan signals GCk+1 to GCn are maintained at inactive levels (i.e., a low level) during each of the second to 120th frames F2 to F120 of the multi-frequency mode MFD, the second display area DA2 of the display panel DP is driven at a frequency lower than the normal frequency. The display device DD may reduce power consumption by lowering the operating frequency of the second display area DA2.

While the second display area DA2 is driven during the second to fourth frames F2 to F4 of the multi-frequency mode MFD, the scan-enable signal GI_EN transitions to a low level.

In the case where the scan-enable signal GI_EN is at a low level when the fourteenth driving transistor DT14 shown in FIG. 9 is turned on, the scan signal GIk+1 output to the first output terminal OUT1 is maintained at a low level.

Moreover, when the scan signal GIk+1 output from the k-th driving stage STk is at a low level, the (k+1)-th driving stage STk+1 receives the scan signal GIk+1 having a low level as a carry signal, and thus the (k+1)-th driving stage STk+1 outputs the scan signal GIk+2 having a low level and the scan signal GCk+1 having a low level.

Accordingly, while the scan-enable signal GI_EN is at a low level in the multi-frequency mode MFD, the scan signals GIk+1 to GIn provided to the scan lines GILk+1 to GILn positioned in the second display area DA2 may be maintained at low levels.

Figure 11:
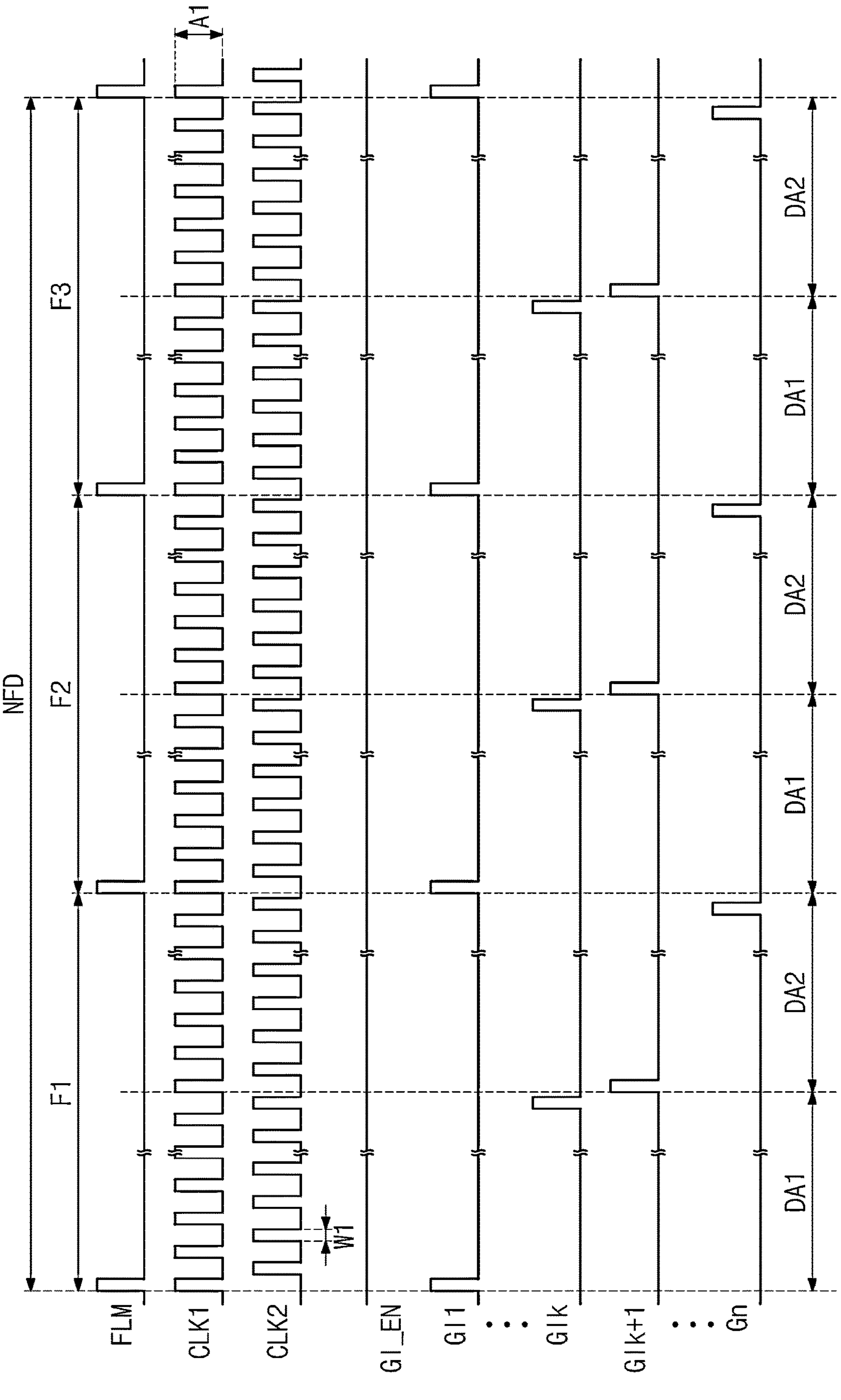
FIG. 11 illustrates a first clock signal and a second clock signal in a single-frequency mode, according to an embodiment of the present disclosure.

FIG. 11 illustrates a first clock signal and a second clock signal in a single-frequency mode, according to an embodiment of the present disclosure.

Referring to FIGS. 7, 9, and 11, the control signal generator 120 may output the first clock signal CLK1 and the second clock signal CLK2 in response to the mode signal MFD_EN.

When the mode signal MFD_EN indicates the single-frequency mode NFD, each of the first clock signal CLK1 and the second clock signal CLK2 has a first pulse width W1 and a first amplitude A1 according to a predetermined first clock frequency.

In an embodiment, the first clock signal CLK1 and the second clock signal CLK2 may have the same first pulse width W1 and the same first amplitude A1 as each other.

In the single-frequency mode NFD, the scan-enable signal GI_EN may be maintained at a high level.

As described in FIG. 10A, the scan signals GI1 to GIn may be sequentially activated to high levels during all of the frames F1 to F3 in the single-frequency mode NFD.

That is, both the first display area DA1 and the second display area DA2 illustrated in FIG. 3A may be driven at a normal frequency (e.g., 120 Hz).

Figure 12:
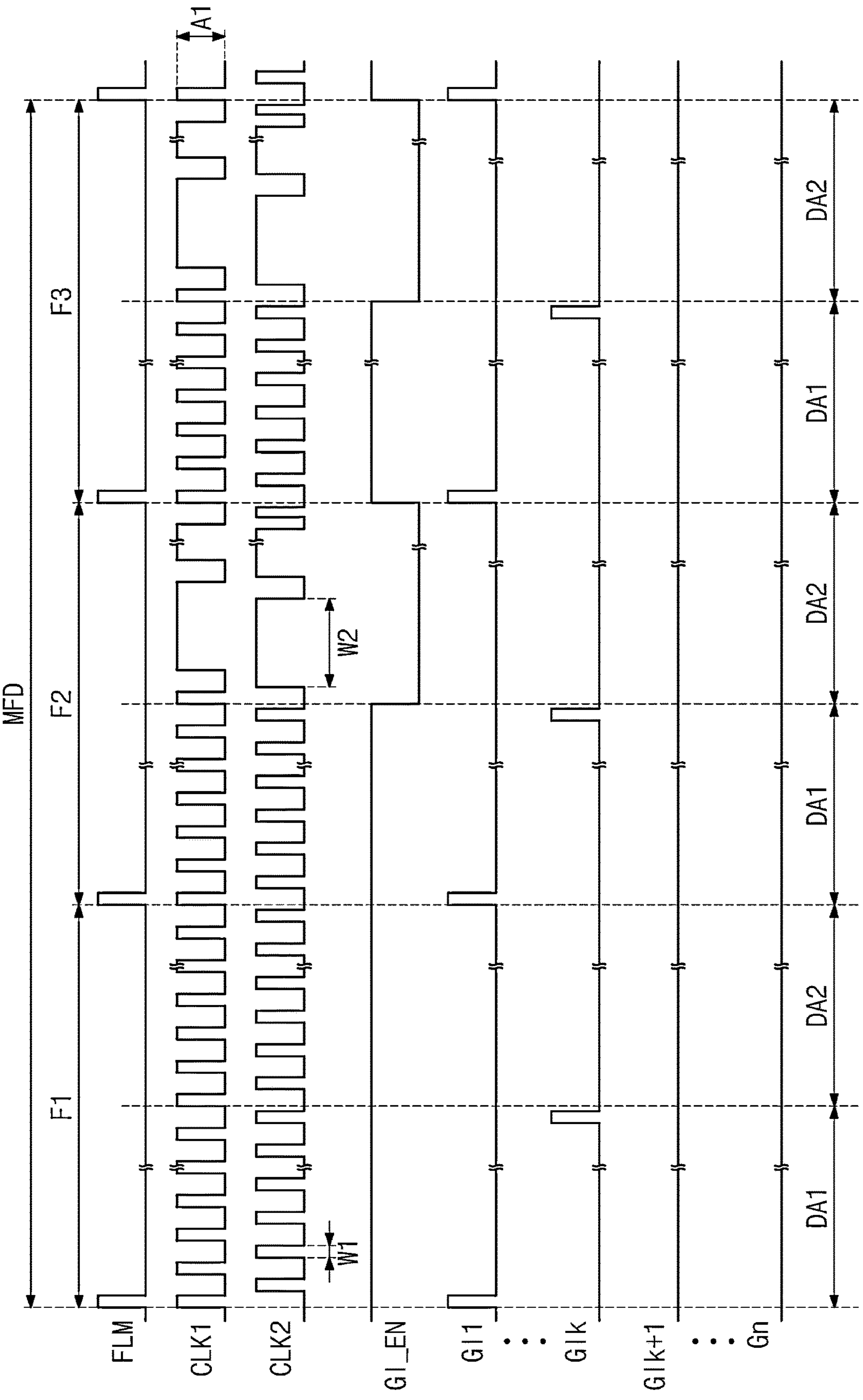
FIG. 12 illustrates a first clock signal and a second clock signal in a multi-frequency mode, according to an embodiment of the present disclosure.

FIG. 12 illustrates a first clock signal and a second clock signal in a multi-frequency mode, according to an embodiment of the present disclosure.

Referring to FIGS. 7, 9, and 12, the control signal generator 120 may output the first clock signal CLK1 and the second clock signal CLK2 in response to the mode signal MFD_EN.

When the mode signal MFD_EN indicates the multi-frequency mode MFD, the control signal generator 120 (see FIG. 7) outputs the first clock signal CLK1 and the second clock signal CLK2 in the normal power mode during the first frame F1. That is, each of the first clock signal CLK1 and the second clock signal CLK2 has the first pulse width W1 according to a predetermined first clock frequency.

When the mode signal MFD_EN indicates the multi-frequency mode MFD, each of the first clock signal CLK1 and the second clock signal CLK2 has the first pulse width W1 according to a predetermined first clock frequency during the first frame F1.

Each of the second frame F2 and the third frame F3 of the multi-frequency mode MFD is a hold frame in which the scan signals GIk+1 to GIn are maintained at inactive levels (e.g., low levels). The image processor 110 (see FIG. 7) may not output a valid image data signal DS during the hold frame.

During the hold frame, that is, a first section during which the first display area DA1 is driven during the second frame F2, the control signal generator 120 (see FIG. 7) outputs the first clock signal CLK1 and the second clock signal CLK2 in the normal power mode.

In an embodiment, during the hold frame, that is, the first section during which the first display area DA1 is driven during the second frame F2, each of the first clock signal CLK1 and the second clock signal CLK2 have the first pulse width W1 according to the first clock frequency.

During the hold frame, that is, a second section during which the second display area DA2 is driven during the second frame F2, the control signal generator 120 (see FIG. 7) outputs the first clock signal CLK1 and the second clock signal CLK2 in a low-power mode. That is, each of the first clock signal CLK1 and the second clock signal CLK2 has a second pulse width W2 according to a second clock frequency. In an embodiment, the second clock frequency is lower than the first clock frequency, and the second pulse width W2 is greater than the first pulse width W1.

The power consumption in the scan driving circuit SD (see FIG. 4) is proportional to the frequency of each of the first clock signal CLK1 and the second clock signal CLK2. That is, as the frequencies of the first clock signal CLK1 and the second clock signal CLK2 increase, the power consumption of the scan driving circuit SD increases. As the frequencies of the first clock signal CLK1 and the second clock signal CLK2 decrease, the power consumption of the scan driving circuit SD decreases. Therefore, the power consumption in the low-power mode is lower that the power consumption in the normal power mode.

During the second section of the second frame F2 of the multi-frequency mode MFD, the scan driving circuit SD maintains the scan signals GIk+1 to GIn and the scan signals GCk+1 to GCn at low levels. Accordingly, even though the frequency of each of the first clock signal CLK1 and the second clock signal CLK2 is lowered when the second display area DA2 is driven during the second frame F2 of the multi-frequency mode MFD, the operation of the scan driving circuit SD is not affected.

FIG. 12 illustrates only the first to third frames F1 to F3. The fourth to 120th frames F4 to F120 shown in FIG. 3B are also hold frames. Waveforms of the first clock signal CLK1 and the second clock signal CLK2 during the fourth to 120th frames F4 to F120 may be the same as those of the first clock signal CLK1 and the second clock signal CLK2 during the second and third frames F2 and F3 shown in FIG. 12.

FIG. 12 illustrates that the pulse width of a high-level section of each of the first clock signal CLK1 and the second clock signal CLK2 is changed from the first pulse width W1 to the second pulse width W2 when the frequency of each of the first clock signal CLK1 and the second clock signal CLK2 is changed from the first clock frequency to the second clock frequency. However, the present disclosure is not limited thereto.

In an embodiment, when the frequency of each of the first clock signal CLK1 and the second clock signal CLK2 is changed from the first clock frequency to the second clock frequency, the pulse width of a low-level section of each of the first clock signal CLK1 and the second clock signal CLK2 is changed.

In an embodiment, the frequency of each of the first clock signal CLK1 and the second clock signal CLK2 may be determined depending on a frequency of the second display area DA2.

In an embodiment, for example, when the operating frequency of each of the first display area DA1 and the second display area DA2 during a single-frequency mode NFD is 120 Hz, the first clock frequency of each of the first clock signal CLK1 and the second clock signal CLK2 may be 10 kilohertz (kHz). When, during a multi-frequency mode MFD, the operating frequency of the first display area DA1 is 120 Hz and the operating frequency of the second display area DA2 is Hz, the second clock frequency of each of the first clock signal CLK1 and the second clock signal CLK2 may be 5 kHz. When, during a multi-frequency mode MFD, the operating frequency of the first display area DA1 is 120 Hz and the operating frequency of the second display area DA2 is 10 Hz, the second clock frequency of each of the first clock signal CLK1 and the second clock signal CLK2 may be 1 kHz. The division ratio of the first clock frequency and the second clock frequency may be changed in various manners.

Figure 13:
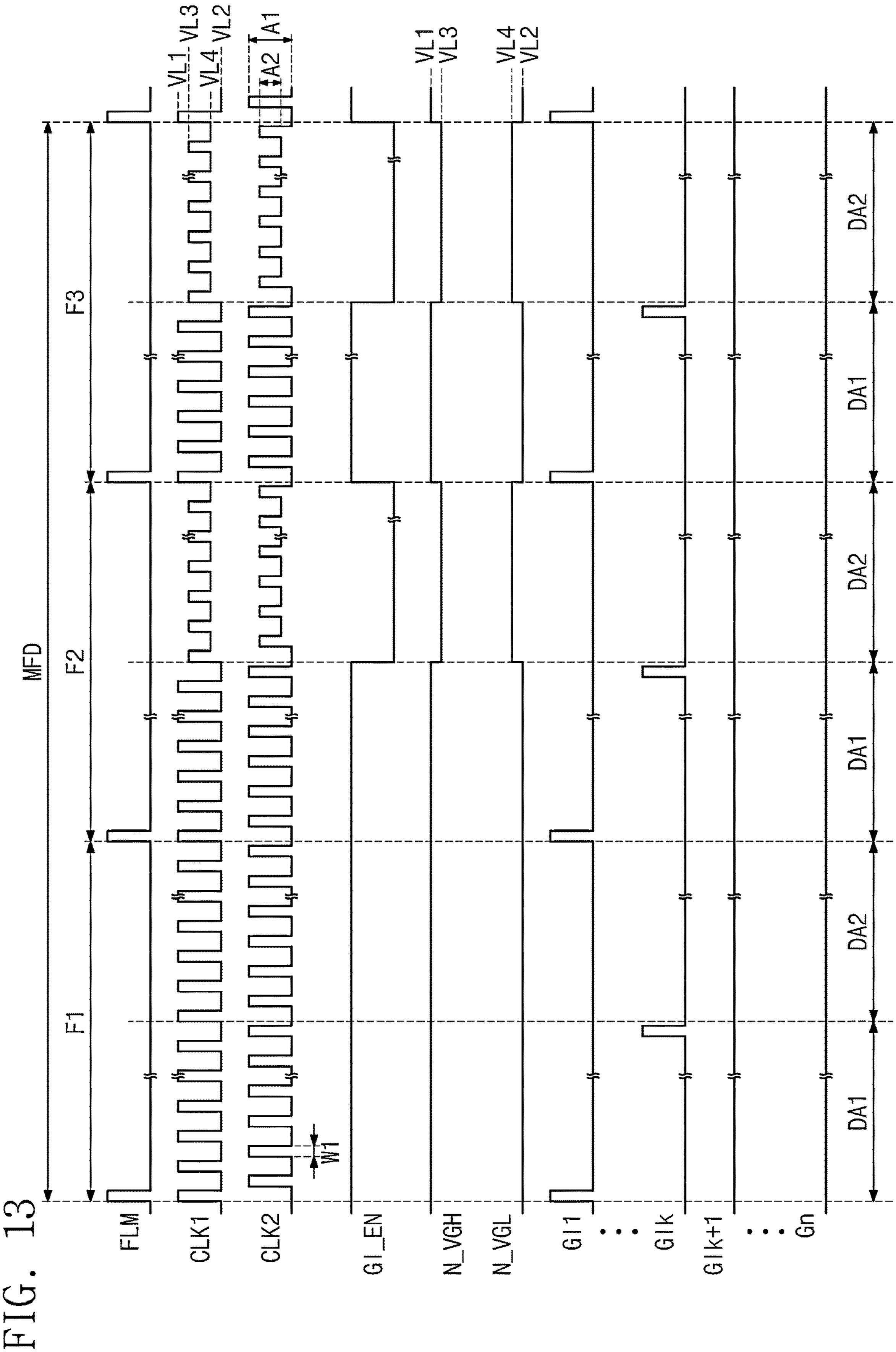
FIG. 13 illustrates a first clock signal and a second clock signal in a multi-frequency mode, according to another embodiment of the present disclosure.

FIG. 13 illustrates a first clock signal and a second clock signal in a multi-frequency mode, according to another embodiment of the present disclosure.

Referring to FIGS. 7, 9 and 13, during the first frame F1 of the multi-frequency mode MFD, the first voltage N_VGH generated from the voltage generator 300 (see FIG. 4) is maintained at a first voltage level VL1, and the second voltage N_VGL generated from the voltage generator 300 is maintained at a second voltage level VL2. The second voltage level VL2 may be lower than the first voltage level VL1.

The control signal generator 120 receives the first voltage N_VGH of the first voltage level VL1 and the second voltage N_VGL of the second voltage level VL2 and then outputs the first clock signal CLK1 and the second clock signal CLK2.

In an embodiment, the control signal generator 120 may output the first clock signal CLK1 and the second clock signal CLK2, which swing between the first voltage N_VGH and the second voltage N_VGL.

During the first frame F1 of the multi-frequency mode MFD, because the first voltage N_VGH is the first voltage level VL1 and the second voltage N_VGL is the second voltage level VL2, each of the first clock signal CLK1 and the second clock signal CLK2 has the first amplitude A1, which corresponds to the difference between the first voltage level VL1 and the second voltage level VL2.

During the first section, in which the first display area DA1 is driven, in the second frame F2 that is a hold frame of the multi-frequency mode MFD, the first voltage N_VGH is at the first voltage level VL1, and the second voltage N_VGL is maintained at the second voltage level VL2. Accordingly, during the first section, the first clock signal CLK1 and the second clock signal CLK2 each have the first amplitude A1.

During the second section, in which the second display area DA2 is driven, in the second frame F2 of the multi-frequency mode MFD, the first voltage N_VGH is changed to the third voltage level VL3, and the second voltage N_VGL is changed to the fourth voltage level VL4. The third voltage level VL3 is lower than the first voltage level VL1 and higher than the second voltage level VL2. The fourth voltage level VL4 is higher than the second voltage level VL2 and lower than the third voltage level VL3 (i.e., VL1>VL3>VL4>VL2).

That is, a voltage difference (VL3−VL4) between the first voltage N_VGH and the second voltage N_VGL in the second section is less than a voltage difference (VL1−VL2) between the first voltage N_VGH and the second voltage N_VGL in the first section.

Accordingly, in the second section of the second frame F2 of the multi-frequency mode MFD, each of the first clock signal CLK1 and the second clock signal CLK2 has the second amplitude A2 smaller than the first amplitude A1. Here, the second amplitude A2 corresponds to the difference between the third voltage level VL3 and the fourth voltage level VL4.

The power consumption in the scan driving circuit SD (see FIG. 4) is proportional to the square of the amplitude of each of the first clock signal CLK1 and the second clock signal CLK2. That is, as the amplitudes of the first clock signal CLK1 and the second clock signal CLK2 increase, the power consumption of the scan driving circuit SD increases. As the amplitudes of the first clock signal CLK1 and the second clock signal CLK2 decrease, the power consumption of the scan driving circuit SD decreases.

When the second display area DA2 is driven during the second frame F2 of the multi-frequency mode MFD, the scan driving circuit SD maintains the scan signals GIk+1 to GIn and the scan signals GCk+1 to GCn at low levels. Accordingly, even though the amplitude of each of the first clock signal CLK1 and the second clock signal CLK2 is lowered when the second display area DA2 is driven during the second frame F2 of the multi-frequency mode MFD, the operation of the scan driving circuit SD is not affected.

Although not shown in drawings, in the single-frequency mode NFD and the multi-frequency mode MFD, the third voltage VGH may be maintained at the first voltage level VL1, and the fourth voltage VGL may be maintained at the second voltage level VL2. As described in FIG. 6B, because the scan signals GW1 to GWn+1 transition to active levels in all the frames of the multi-frequency mode MFD, the voltage levels of the third voltage VGH and the fourth voltage VGL are not changed. However, the present disclosure is not limited thereto. In another embodiment, during the multi-frequency mode MFD, the voltage levels of the third voltage VGH and the fourth voltage VGL may be changed to be the same as the first voltage N_VGH and the second voltage N_VGL.

FIG. 13 illustrates only the first to third frames F1 to F3. The fourth to 120th frames F4 to F120 shown in FIG. 3B are also hold frames. Waveforms of the first clock signal CLK1 and the second clock signal CLK2 during the fourth to 120th frames F4 to F120 may be the same as those of the first clock signal CLK1 and the second clock signal CLK2 during the second and third frames F2 and F3 shown in FIG. 13.

Figure 14:
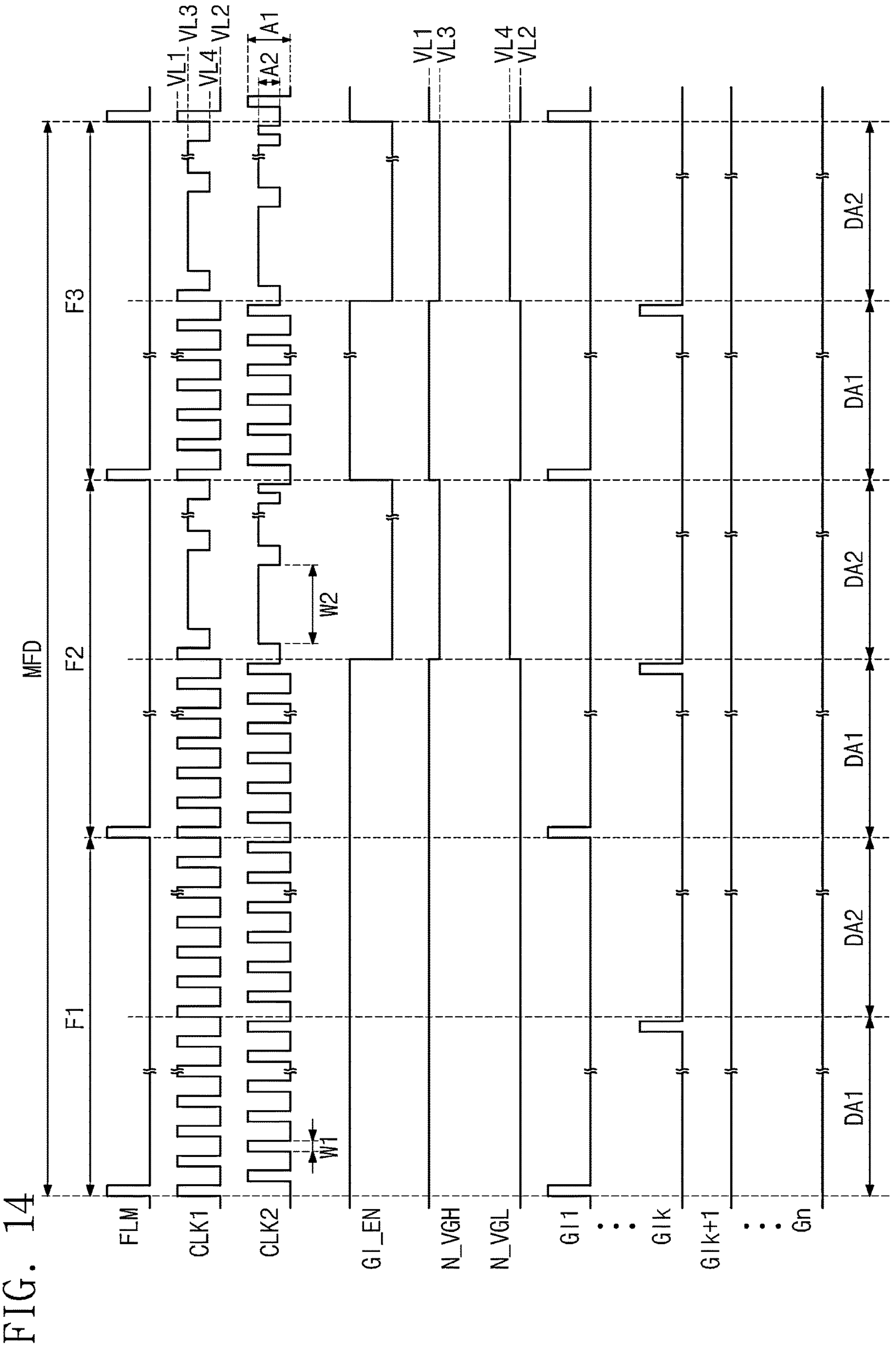
FIG. 14 illustrates a first clock signal and a second clock signal in a multi-frequency mode, according to still another embodiment of the present disclosure.

FIG. 14 illustrates a first clock signal and a second clock signal in a multi-frequency mode, according to still another embodiment of the present disclosure.

Referring to FIGS. 7, 9 and 14, during the first frame F1 of the multi-frequency mode MFD, the first voltage N_VGH generated from the voltage generator 300 (see FIG. 4) is maintained at a first voltage level VL1, and the second voltage N_VGL generated from the voltage generator 300 is maintained at a second voltage level VL2.

The control signal generator 120 receives the first voltage N_VGH of the first voltage level VL1 and the second voltage N_VGL of the second voltage level VL2 and then outputs the first clock signal CLK1 and the second clock signal CLK2.

In an embodiment, the control signal generator 120 may output the first clock signal CLK1 and the second clock signal CLK2, which swing between the first voltage N_VGH and the second voltage N_VGL.

During the first frame F1 of the multi-frequency mode MFD, because the first voltage N_VGH is the first voltage level VL1 and the second voltage N_VGL is the second voltage level VL2, each of the first clock signal CLK1 and the second clock signal CLK2 has the first amplitude A1. Besides, during the first frame F1 of the multi-frequency mode MFD, each of the first clock signal CLK1 and the second clock signal CLK2 has the first pulse width W1.

During the first section, in which the first display area DA1 is driven, in the second frame F2 that is a hold frame of the multi-frequency mode MFD, the first voltage N_VGH is at the first voltage level VL1, and the second voltage N_VGL is maintained at the second voltage level VL2. Accordingly, when the first display area DA1 is driven during the second frame F2 of the multi-frequency mode MFD, each of the first clock signal CLK1 and the second clock signal CLK2 has the first amplitude A1. When the first display area DA1 is driven during the second frame F2 of the multi-frequency mode MFD, each of the first clock signal CLK1 and the second clock signal CLK2 has the first pulse width W1.

During the first section, in which the second display area DA2 is driven, in the second frame F2 that is a hold frame of the multi-frequency mode MFD, the first voltage N_VGH is changed to the third voltage level VL3, and the second voltage N_VGL is changed to the fourth voltage level VL4. The third voltage level VL3 is lower than the first voltage level VL1, and the fourth voltage level VL4 is higher than the second voltage level VL2.

When the second display area DA2 is driven during the second frame F2 of the multi-frequency mode MFD, because the first voltage N_VGH is the third voltage level VL3 and the second voltage N_VGL is the fourth voltage level VL4, each of the first clock signal CLK1 and the second clock signal CLK2 may swing between the first voltage N_VGH of the third voltage level VL3 and the second voltage N_VGL of the fourth voltage level VL4. That is, each of the first clock signal CLK1 and the second clock signal CLK2 has the second amplitude A2. In an embodiment, the second amplitude A2 is smaller than the first amplitude A1.

Besides, during the second section of the second frame F2 of the multi-frequency mode MFD, each of the first clock signal CLK1 and the second clock signal CLK2 has the second pulse width W2. The second pulse width W2 is greater than the first pulse width W1.

The power consumption in the scan driving circuit SD (see FIG. 4) is proportional to the square of the amplitude of each of the first clock signal CLK1 and the second clock signal CLK2. Furthermore, the power consumption in the scan driving circuit SD is proportional to the frequency of each of the first clock signal CLK1 and the second clock signal CLK2.

During the second section of the second frame F2 in the multi-frequency mode MFD, the power consumption in the scan driving circuit SD may be minimized by decreasing the amplitude and frequency of each of the first clock signal CLK1 and the second clock signal CLK2 provided to the scan driving circuit SD.

The driving stage STk shown in FIG. 9 receives the first voltage N_VGH through the first voltage terminal V1, and receives the second voltage N_VGL through the second voltage terminal V2.

As the first voltage N_VGH is changed to the third voltage level VL3 and the second voltage N_VGL is changed to the fourth voltage level VL4 during the second section of the second frame F2 of the multi-frequency mode MFD, the power consumption in the scan driving circuit SD may be reduced.

FIG. 14 illustrates only the first to third frames F1 to F3. The fourth to 120th frames F4 to F120 shown in FIG. 3B are also hold frames. Waveforms of the first clock signal CLK1 and the second clock signal CLK2 during the fourth to 120th frames F4 to F120 may be the same as those of the first clock signal CLK1 and the second clock signal CLK2 during the second and third frames F2 and F3 shown in FIG. 14.

Figure 15:
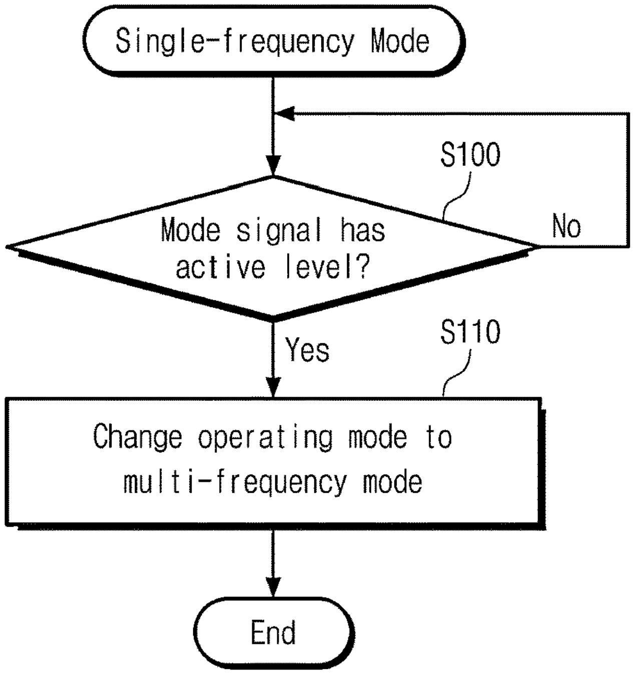
FIG. 15 is a flowchart illustrating an operation of a driving controller in a single-frequency mode, according to an embodiment of the present disclosure.

FIG. 15 is a flowchart illustrating an operation of a driving controller in a single-frequency mode, according to an embodiment of the present disclosure.

Referring to FIGS. 4 and 15, at an initial time (e.g., after power-up), an operating mode of the driving controller 100 may be set to a single-frequency mode.

The driving controller 100 determines a frequency mode in response to the mode signal MFD_EN. The driving controller 100 detects a signal level of the mode signal MFD_EN (operation S100). In an embodiment, for example, when the signal level of the mode signal MFD_EN is at an active level (e.g., a low level), the driving controller 100 changes an operating mode to the multi-frequency mode (operation S110).

Figure 16:
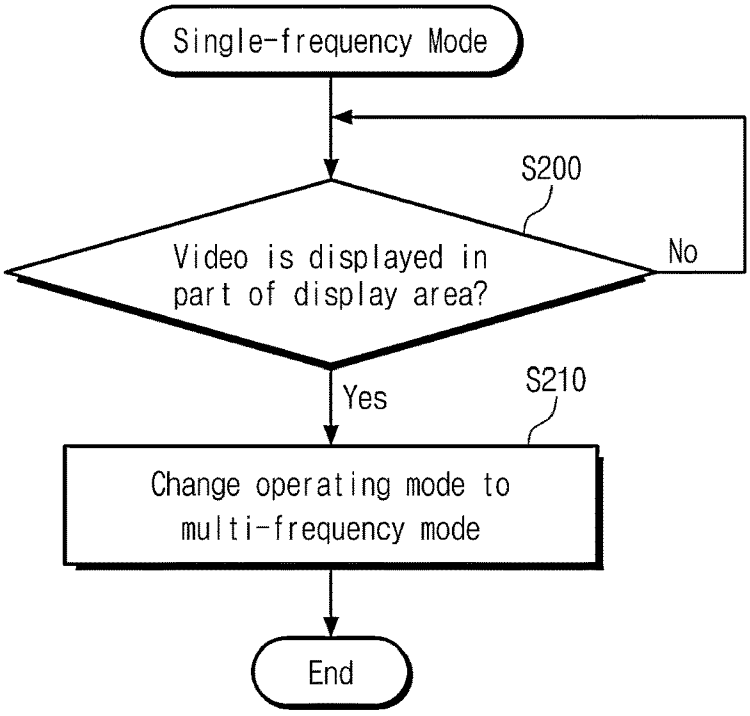
FIG. 16 is a flowchart illustrating an operation of a driving controller in a single-frequency mode, according to an embodiment of the present disclosure.

FIG. 16 is a flowchart illustrating an operation of a driving controller in a single-frequency mode, according to an embodiment of the present disclosure.

Referring to FIGS. 4 and 16, at an initial time (e.g., after power-up), an operating mode of the driving controller 100 may be set to a single-frequency mode.

The driving controller 100 determines a frequency mode in response to the image signal RGB and the control signal CTRL. In an embodiment, for example, when a part (e.g., an image signal corresponding to the first display area DA1 (see FIG. 1)) of the image signal RGB during one frame is a video and another part (e.g., an image signal corresponding to the second display area DA2 (see FIG. 1)) of the image signal RGB is a still image (in operation S200), the driving controller 100 changes an operating mode to a multi-frequency mode (in operating S210).

Figure 17:
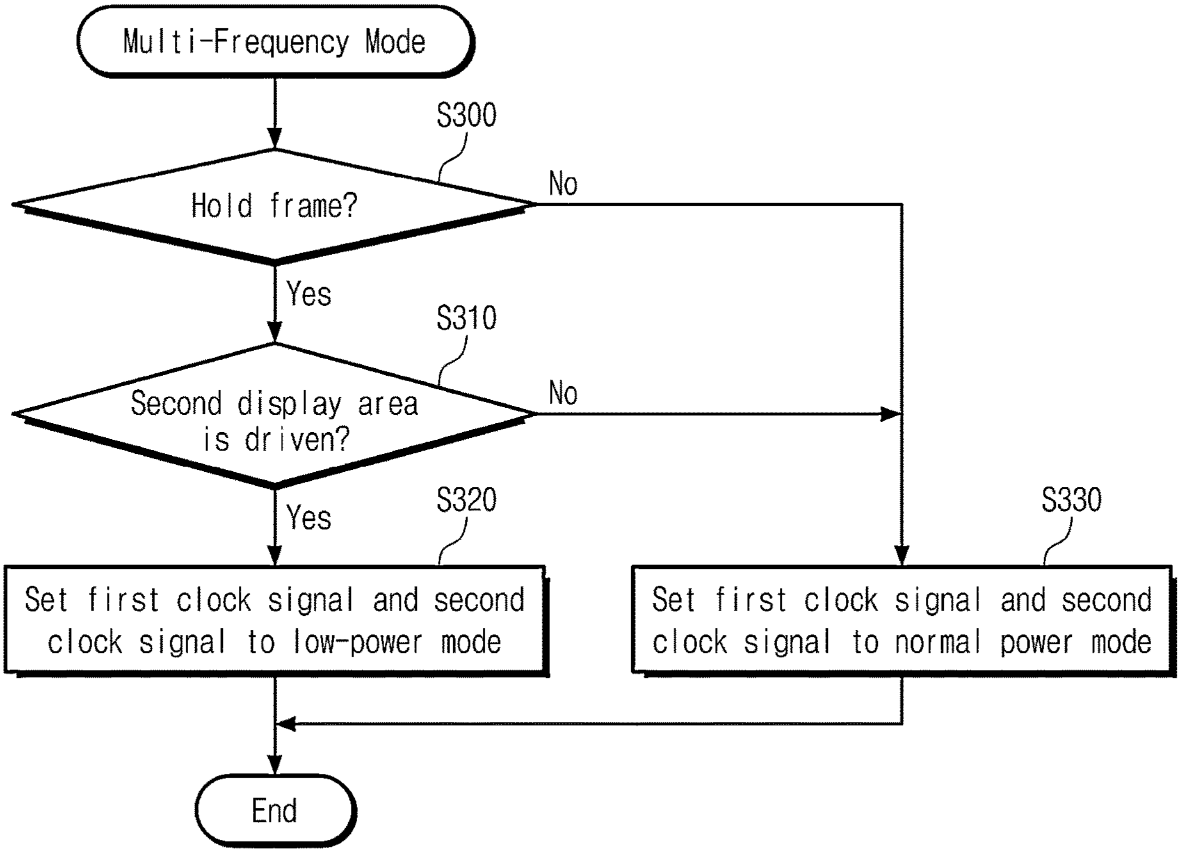
FIG. 17 is a flowchart illustrating an operation of a driving controller in a multi-frequency mode, according to an embodiment of the present disclosure.

FIG. 17 is a flowchart illustrating an operation of a driving controller in a multi-frequency mode, according to an embodiment of the present disclosure.

Referring to FIGS. 3B, 4, and 17, during a multi-frequency mode, the first display area DA1 may be driven at a first operating frequency, and the second display area DA2 may be driven at a second operating frequency lower than the first operating frequency.

The driving controller 100 determines whether a current frame is a hold frame (operation S300).

In an embodiment, during the multi-frequency mode, the first display area DA1 may be driven at a first operating frequency of 120 Hz, and the second display area DA2 may be driven at a second operating frequency of 1 Hz.

In the example shown in FIGS. 12 to 14, the first frame F1 is a frame in which both the first display area DA1 and the second display area DA2 are driven. Each of the second frame F2 and the third frame F3 may be referred to as a hold frame in which only the first display area DA1 is driven and the second display area DA2 is not driven.

When the current frame is not the hold frame (i.e., when the current frame is the first frame F1), an operating mode of each of the first clock signal CLK1 and the second clock signal CLK2 may be set to a normal power mode (operation S330). In this case, each of the first clock signal CLK1 and the second clock signal CLK2 may have the first pulse width W1 and the first amplitude A1.

When the current frame is a hold frame, it is determined whether the second display area DA2 is driven (operation S310). When the first display area DA1 is driven (i.e., during the first section of the hold frame), an operating mode of each of the first clock signal CLK1 and the second clock signal CLK2 may be set to a normal power mode (operation S330). In this case, each of the first clock signal CLK1 and the second clock signal CLK2 may have the first pulse width W1 and the first amplitude A1.

When the second display area DA2 is driven (i.e., during the second section of the hold frame), an operating mode of each of the first clock signal CLK1 and the second clock signal CLK2 may be set to a low-power mode (operation S320).

In an embodiment, as shown in FIG. 12, in the low-power mode, each of the first clock signal CLK1 and the second clock signal CLK2 may have the second pulse width W2 greater than the first pulse width W1.

In an embodiment, as shown in FIG. 13, in the low-power mode, each of the first clock signal CLK1 and the second clock signal CLK2 may have the second amplitude A2 smaller than the first amplitude A1.

In an embodiment, as shown in FIG. 14, in the low-power mode, each of the first clock signal CLK1 and the second clock signal CLK2 may have the second pulse width W2 greater than the first pulse width W1 and the second amplitude A2 smaller than the first amplitude A1.

During the first frame F1 in the single-frequency mode and the first section of each of the second to 120th frames F2 to F120 which are the hold frames in the multi-frequency mode, the scan driving circuit SD may drive the scan lines GIL1 to GILn and GCL1 to GCLn in synchronization with the first clock signal CLK1 and the second clock signal CLK2 of a normal power mode.

During the second section of each of the second to 120th frames F2 to F120 which are the hold frames in the multi-frequency mode, the scan driving circuit SD may drive the scan lines GIL1 to GILn and GCL1 to GCLn in synchronization with the first clock signal CLK1 and the second clock signal CLK2 in the low-power mode.

When the second display area DA2 is driven in the multi-frequency mode MFD, the power consumption in the scan driving circuit SD may be reduced by changing the pulse width or/and amplitude of each of the first clock signal CLK1 and the second clock signal CLK2.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

A display device having such a configuration may operate in a multi-frequency mode in which a first display area is driven at a first operating frequency and a second display area is driven at a second operating frequency lower than the first operating frequency. As the operating frequency of the second display area decreases, power consumption of the display device may be reduced. In the multi-frequency mode, the frequency of a clock signal provided to a scan driving circuit driving the second display area may be lower than the frequency in the single-frequency mode. Accordingly, the power consumption of the display device may be effectively reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels connected to a plurality of scan lines and divided into a first display area which operates at a first operating frequency and a second display area which operates at a second operating frequency;

a scan driving circuit, which drives the plurality of scan lines in synchronization with a clock signal; and a driving controller, which outputs the clock signal, wherein, while an operating mode is a multi-frequency mode, the scan driving circuit provides scan signals of a first operating frequency to first scan lines positioned in the first display area among the plurality of scan lines, and provides scan signals of a second operating frequency lower than the first operating frequency to second scan lines positioned in the second display area among the plurality of scan lines, wherein a hold frame of the multi-frequency mode includes a first section during which the first display area is driven, and a second section during which the second display area is driven, and wherein the driving controller has a control signal generator that outputs the clock signal in a normal power mode during the first section and outputs the clock signal in a low-power mode during the second section.

2. The display device of claim 1, wherein, during the first section, a frequency of the clock signal is a first clock frequency, and wherein, during the second section, the frequency of the clock signal is a second clock frequency lower than the first clock frequency.

3. The display device of claim 2, wherein, during the first section, the clock signal has a first pulse width, and wherein, during the second section, the clock signal has a second pulse width greater than the first pulse width.

4. The display device of claim 2, wherein the driving controller receives a mode signal and outputs the clock signal having one of the first clock frequency and the second clock frequency in response to the mode signal.

5. The display device of claim 1, further comprising: a voltage generator, which generates a first voltage and a second voltage in response to a voltage control signal, wherein the driving controller outputs the voltage control signal corresponding to the operating mode and outputs the clock signal that swings between the first voltage and the second voltage.

6. The display device of claim 5, wherein, while the operating mode is a single-frequency mode, the first voltage has a first voltage level, and the second voltage has a second voltage level lower than the first voltage level.

7. The display device of claim 6, wherein, while the operating mode is the multi-frequency mode, during the second section, the first voltage has a third voltage level lower than the first voltage level, and the second voltage has a fourth voltage level higher than the second voltage level.

8. The display device of claim 1, wherein, during the first section of the hold frame, the clock signal has a first amplitude, and Wherein, during the second section of the hold frame, the clock signal has a second amplitude smaller than the first amplitude.

9. The display device of claim 1, wherein, while the operating mode is the multi-frequency mode, the driving controller outputs a scan-enable signal indicating a start timing of the second section, and wherein the scan driving circuit maintains scan signals, which are provided to the second scan lines positioned in the second display area, from among the plurality of scan lines at inactive levels in response to the scan-enable signal.

10. The display device of claim 1, wherein, during the first section of the hold frame, the clock signal has a first pulse width and a first amplitude, and wherein, during the second section of the hold frame, the clock signal has a second pulse width greater than the first pulse width and a second amplitude smaller than the first amplitude.

11. The display device of claim 1, wherein, while the operating mode is a single-frequency mode, the scan driving circuit provides the plurality of scan lines with scan signals of a normal frequency lower than or equal to the first operating frequency and higher than the second operating frequency.

12. A display device comprising:

a display panel including a plurality of pixels connected to a plurality of scan lines and divided into a first display area which operates at a first operating frequency and a second display area which operates at a second operating frequency;

a scan driving circuit, which drives the plurality of scan lines in synchronization with a clock signal;

a voltage generator, which generates a first voltage and a second voltage in response to a voltage control signal; and a driving controller, which outputs the clock signal, wherein, in a multi-frequency mode, the scan driving circuit provides scan signals of a first operating frequency to first scan lines positioned in the first display area among the plurality of scan lines, and provides scan signals of a second operating frequency lower than the first operating frequency to second scan lines positioned in the second display area among the plurality of scan lines, wherein a hold frame of the multi-frequency mode includes a first section during which the first display area is driven, and a second section during which the second display area is driven, wherein a voltage difference between the first voltage and the second voltage during the second section is smaller than a voltage difference between the first voltage and the second voltage during the first section, and wherein the clock signal is a signal that swings between the first voltage and the second voltage.

13. The display device of claim 12, wherein, during the first section, the first voltage has a first voltage level, and the second voltage has a second voltage level different from the first voltage level.

14. The display device of claim 13, wherein, during the second section, the first voltage has a third voltage level lower than the first voltage level, and the second voltage has a fourth voltage level higher than the second voltage level.

15. The display device of claim 12, wherein, during the first section, the clock signal has a first clock frequency, and wherein, during the second section, the clock signal has a second clock frequency lower than the first clock frequency.

16. The display device of claim 15, wherein, during the first section, the clock signal has a first pulse width, and Wherein, during the second section, the clock signal has a second pulse width greater than the first pulse width.

17. An electronic device comprising:

a display device, which receives a mode signal from a host processor and displays an image, wherein the display device comprises:

a display panel including a plurality of pixels connected to a plurality of scan lines and divided into a first display area which operates at a first operating frequency and a second display area which operates at a second operating frequency;

a scan driving circuit, which drives the plurality of scan lines in synchronization with a clock signal; and a driving controller, which outputs the clock signal in response to the mode signal, wherein, while an operating mode is a multi-frequency mode, the scan driving circuit provides scan signals of a first operating frequency to first scan lines positioned in the first display area among the plurality of scan lines, and provides scan signals of a second operating frequency lower than the first operating frequency to second scan lines positioned in the second display area among the plurality of scan lines, wherein a hold frame of the multi-frequency mode includes a first section during which the first display area is driven, and a second section during which the second display area is driven, and wherein the driving controller has a control signal generator that outputs the clock signal in a normal power mode during the first section and outputs the clock signal in a low-power mode during the second section.

18. The electronic device of claim 17, wherein, during the first section, a frequency of the clock signal is a first clock frequency, and wherein, during the second section, the frequency of the clock signal is a second clock frequency lower than the first clock frequency.

19. The electronic device of claim 17, wherein, during the first section, the clock signal has a first pulse width, and wherein, during the second section, the clock signal has a second pulse width greater than the first pulse width.

20. The electronic device of claim 17, further comprising:

a voltage generator, which generates a first voltage and a second voltage in response to a voltage control signal, wherein the driving controller outputs the voltage control signal corresponding to the operating mode and outputs the clock signal that swings between the first voltage and the second voltage, wherein, while the operating mode is a single-frequency mode, the first voltage has a first voltage level, and the second voltage has a second voltage level lower than the first voltage level, and wherein, while the operating mode is the multi-frequency mode, during the second section, the first voltage has a third voltage level lower than the first voltage level, and the second voltage has a fourth voltage level higher than the second voltage level.

* * * * *